United States Patent
Tan et al.

(10) Patent No.: US 10,957,940 B2
(45) Date of Patent: Mar. 23, 2021

(54) SEMI-SOLID ELECTRODES WITH A POLYMER ADDITIVE

(71) Applicant: 24M Technologies, Inc., Cambridge, MA (US)

(72) Inventors: Taison Tan, Cambridge, MA (US); Naoki Ota, Lexington, MA (US); Jeffry Disko, North Brookfield, MA (US)

(73) Assignee: 24M Technologies, Inc., Cambridge, MA (US)

( * ) Notice: Subject to any disclaimer, the term of this patent is extended or adjusted under 35 U.S.C. 154(b) by 79 days.

(21) Appl. No.: 16/152,728

(22) Filed: Oct. 5, 2018

(65) Prior Publication Data
US 2019/0245242 A1 Aug. 8, 2019

Related U.S. Application Data

(63) Continuation of application No. 14/336,119, filed on Jul. 21, 2014, now Pat. No. 10,122,044.
(Continued)

(51) Int. Cl.
*H01M 10/0565* (2010.01)
*H01M 4/62* (2006.01)
(Continued)

(52) U.S. Cl.
CPC ......... *H01M 10/0565* (2013.01); *H01M 4/13* (2013.01); *H01M 4/62* (2013.01);
(Continued)

(58) Field of Classification Search
CPC ........... H01M 10/052; H01M 10/0565; H01M 10/058; H01M 2300/0085; H01M 4/13;
(Continued)

(56) References Cited

U.S. PATENT DOCUMENTS 3,660,170 A 5/1972 Rampel
4,054,727 A * 10/1977 O'Nan ................... H01M 2/12
429/86
(Continued)

FOREIGN PATENT DOCUMENTS

WO WO 2011/084649 7/2011
WO WO 2015/009990 1/2015

OTHER PUBLICATIONS

Office Action for U.S. Appl. No. 14/336,119, dated Nov. 4, 2016, 17 pages.
(Continued)

*Primary Examiner* — Lingwen R Zeng
(74) *Attorney, Agent, or Firm* — Cooley LLP

(57) ABSTRACT

Embodiments described herein relate generally to electrochemical cells having semi-solid electrodes that include a gel polymer additive such that the electrodes demonstrate longer cycle life while significantly retaining the electronic performance of the electrodes and the electrochemical cells formed therefrom. In some embodiments, a semi-solid electrode can include about 20% to about 75% by volume of an active material, about 0.5% to about 25% by volume of a conductive material, and about 20% to about 70% by volume of an electrolyte. The electrolyte further includes about 0.01% to about 1.5% by weight of a polymer additive. In some embodiments, the electrolyte can include about 0.1% to about 0.7% of the polymer additive.

21 Claims, 12 Drawing Sheets

Related U.S. Application Data

(60) Provisional application No. 61/856,188, filed on Jul. 19, 2013.

(51) Int. Cl.
*H01M 4/64* (2006.01)
*H01M 10/052* (2010.01)
*H01M 4/13* (2010.01)
*H01M 10/058* (2010.01)

(52) U.S. Cl.
CPC ............ *H01M 4/624* (2013.01); *H01M 4/64* (2013.01); *H01M 10/052* (2013.01); *H01M 10/058* (2013.01); *H01M 2300/0085* (2013.01); *Y10T 29/49108* (2015.01)

(58) Field of Classification Search
CPC .......... H01M 4/62; H01M 4/624; H01M 4/64; Y10T 29/49108; Y02E 60/10
See application file for complete search history.

(56) References Cited

U.S. PATENT DOCUMENTS

| | | |
|---|---|---|
| 8,722,226 B2 | 5/2014 | Chiang et al. |
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 2002/0086206 A1 | 7/2002 | Fauteux et al. |
| 2004/0048163 A1* | 3/2004 | Park .................. H01M 10/0567 429/326 |
| 2005/0014072 A1* | 1/2005 | Yamaguchi ....... H01M 10/0525 429/329 |
| 2005/0074669 A1 | 4/2005 | Park et al. |
| 2009/0317723 A1 | 12/2009 | Yu et al. |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1* | 11/2011 | Duduta ................ H01M 8/225 429/50 |
| 2011/0287325 A1 | 11/2011 | Zaghib et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |

OTHER PUBLICATIONS

Office Action for U.S. Appl. No. 14/336,119, dated Aug. 8, 2017, 16 pages.

International Search Report and Written Opinion for International Application No. PCT/US2014/047136, dated Mar. 31, 2015, 9 pages.

* cited by examiner

SEMI-SOLID ELECTRODES WITH A POLYMER ADDITIVE

CROSS REFERENCE TO RELATED APPLICATIONS

This application is a continuation of U.S. patent application Ser. No. 14/336,119, filed Jul. 21, 2014, now U.S. Pat. No. 10,122,044, entitled "Semi-Solid Electrodes With a Polymer Additive,", which claims priority to and benefit of U.S. Provisional Patent Application No. 61/856,188, filed Jul. 19, 2013, entitled "Semi-Solid Electrodes with Gel Polymer Additives," the disclosures of which are incorporated by reference herein in their entirety.

Statement Regarding Federally Sponsored Research or Development

This invention was made with government support under Grant Number DE-AR0000102 awarded by the Department of Energy. The government has certain rights in the invention.

BACKGROUND

Embodiments described herein relate generally to electrochemical cells having semi-solid electrodes that include a polymer additive such that the electrodes demonstrate better physical properties and longer cycle life while significantly retaining the electronic performance of the electrodes and the electrochemical cells formed therefrom.

Electrochemical cells or batteries are typically constructed of solid electrodes, separators, electrolyte, and ancillary components such as, for example, packaging, thermal management, cell balancing, consolidation of electrical current carriers into terminals, and/or other such components. The electrodes typically include active materials, conductive materials, binders and other additives.

Conventional methods for preparing electrochemical cells generally include coating a metallic substrate (e.g., a current collector) with slurry composed of an active material, a conductive additive, and a binding agent dissolved or dispersed in a solvent, evaporating the solvent, and calendering the dried solid matrix to a specified thickness. The electrodes are then cut, packaged with other components, infiltrated with electrolyte and the entire package is then sealed.

Such known methods generally involve complicated and expensive manufacturing steps such as casting the electrode and are only suitable for electrodes of limited thickness, for example, less than 100 μm (final single sided coated thickness). These known methods for producing electrodes of limited thickness result in batteries with lower capacity, lower energy density and a high ratio of inactive components to active materials. Furthermore, the binders used in known electrode formulations can increase tortuosity and decrease the ionic conductivity of the electrode.

Known electrochemical batteries such as, for example, lithium-ion batteries also lose their charge capacity after repeated charge and discharge cycles. Lithium-ion batteries are known to lose about 20% of their initial charge capacity after a year. This loss is attributed to many factors including, for example, internal oxidation, exposure to high temperatures, alterations in crystal structure of components included in the anode and/or cathode, gas generation, and physical wear and tear. There is a need for new electrochemical batteries that do not lose charge capacity or do so at a much lower rate such that they have longer cycle life.

Thus, it is an enduring goal of energy storage systems development to develop new electrochemical batteries and electrodes that have longer cycle life, increased energy density, charge capacity and overall performance.

SUMMARY

Embodiments described herein relate generally to electrochemical cells having semi-solid electrodes that include a polymer additive such that the electrodes demonstrate better physical properties and longer cycle life while significantly retaining the electronic performance of the electrodes and the electrochemical cells formed therefrom. In some embodiments, a semi-solid electrode can include about 20% to about 75% by volume of an active material, about 0.5% to about 25% by volume of a conductive material, and about 20% to about 70% by volume of an electrolyte. The electrolyte further includes about 0.1% to about 1.5% by weight of a polymer additive. In some embodiments, the electrolyte can include about 0.1% to about 1% of the polymer additive.

DETAILED DESCRIPTION

Figure 1:
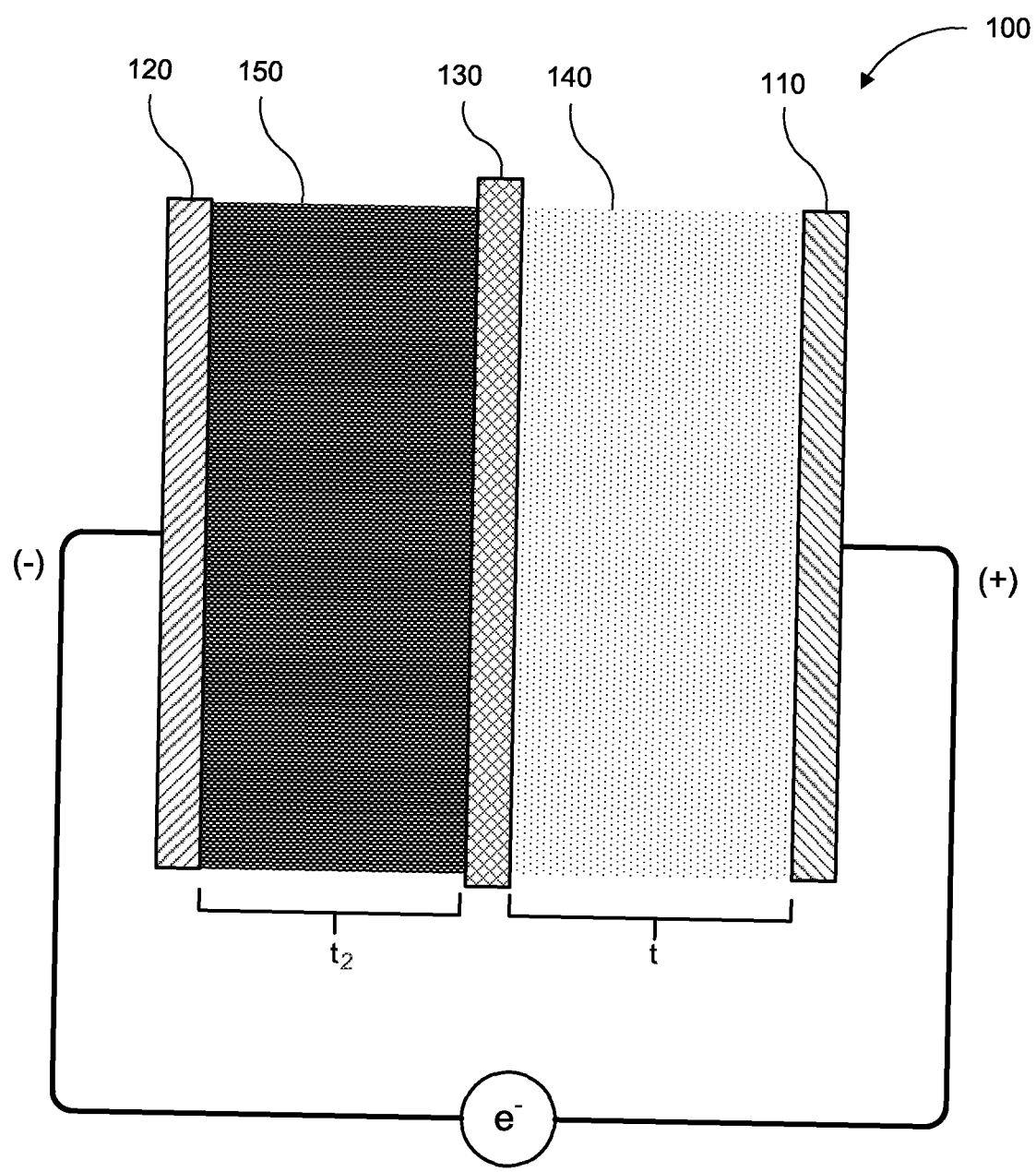
FIG. 1 is a schematic illustration of an electrochemical cell, according to an embodiment.

Embodiments described herein relate generally to electrochemical cells having semi-solid electrodes that include a polymer additive such that the electrodes demonstrate better physical properties and longer cycle life while significantly retaining the electronic performance of the electrodes and the electrochemical cells formed therefrom.

Consumer electronic batteries have gradually increased in energy density with the progress of lithium-ion battery technology. The stored energy or charge capacity of a manufactured battery is a function of: (1) the inherent charge capacity of the active material (mAh/g), (2) the volume of the electrodes ($cm^3$) (i.e., the product of the electrode thickness, electrode area, and number of layers (stacks), and (3) the loading of active material in the electrode media (e.g., grams of active material per $cm^3$ of electrode media). Therefore, to enhance commercial appeal (e.g., increased energy density and decreased cost), it is generally desirable to increase the areal charge capacity ($mAh/cm^2$). The areal charge capacity can be increased, for example, by utilizing active materials that have a higher inherent charge capacity, increasing relative percentage of active charge storing material (i.e., "loading") in the overall electrode formulation, and/or increasing the relative percentage of electrode material used in any given battery form factor. Said another way, increasing the ratio of active charge storing components (e.g., the electrodes) to inactive components (e.g., the separators and current collectors), increases the overall energy density of the battery by eliminating or reducing components that are not contributing to the overall performance of the battery. One way to accomplish increasing the areal charge capacity, and therefore reducing the relative percentage of inactive components, is by increasing the thickness of the electrodes.

Semi-solid electrodes described herein can be made: (i) thicker (e.g., greater than 250 μm-up to 2,000 μm or even greater) due to the reduced tortuosity and higher electronic conductivity of the semi-solid electrode, (ii) with higher loadings of active materials, and (iii) with a simplified manufacturing process utilizing less equipment. These semi-solid electrodes can be formed in fixed or flowable configurations and decrease the volume, mass and cost contributions of inactive components with respect to active components, thereby enhancing the commercial appeal of batteries made with the semi-solid electrodes. In some embodiments, the semi-solid electrodes described herein are binderless and/or do not use binders that are used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and higher electronic conductivity of the semi-solid electrodes described herein, results in superior rate capability and charge capacity of electrochemical cells formed from the semi-solid electrodes. Embodiments of the semi-solid electrodes described herein can be used in any electrochemical cell such as, for example, a primary battery, a secondary battery, an electrodouble layer capacitor, a pseudocapacitor, or any other electrochemical cell or combination thereof.

Since the semi-solid electrodes described herein, can be made substantially thicker than conventional electrodes, the ratio of active materials (i.e., the semi-solid cathode and/or anode) to inactive materials (i.e. the current collector and separator) can be much higher in a battery formed from electrochemical cells that include the semi-solid electrodes described herein relative to a similar battery formed form electrochemical cells that include conventional electrodes. This substantially increases the overall charge capacity and energy density of a battery that includes the semi-solid electrodes described herein. Examples of electrochemical cells utilizing thick semi-solid electrodes and various formulations thereof are described in U.S. Patent Application Publication No. 2014/0170524 (also referred to as "the '524 publication"), published Jun. 19, 2014, entitled "Semi-Solid Electrodes Having High Rate Capability," and U.S. patent application Ser. No. 14/202,606 (also referred to as "the '606 application), filed Mar. 15, 2013, entitled "Asymmetric Battery Having a Semi-Solid Cathode and High Energy Density Anode," the entire disclosures of which are hereby incorporated by reference.

Known electrochemical batteries such as, for example, lithium ion batteries tend to lose their initial charge capacity after each charge/discharge cycle. For example, it is known that lithium batteries used in devices, such as, for example, cell phones, laptops, cameras, etc. do not maintain the same charge capacity that was held by the lithium batteries when they were initially charged. Lithium batteries are known to lose about 20% of their initial charge capacity after a year of normal use. Without being bound by any particular theory, this decrease in charge capacity is attributed to, for example, (1) internal cell oxidation; (2) change in crystal structure of the cathode and/or anode; (3) thickening and/or breakdown of the solid electrolyte interphase (SEI) layer formed by the non-aqueous electrolyte on the anode; (4) exposure to high temperatures such as, for example, temperatures above 100 degrees Fahrenheit, and; (5) physical wear and tear of the cathode, anode, and/or current collectors. In particular, the electrodes can expand and contract during charging and discharging because of the intercalation of lithium ions into and out of the electrodes which results in increased internal impedance and/or breakdown of the anode SEI layer. Furthermore, gas generation due to known electrochemical reactions in lithium batteries can also contribute to the ultimate wear and tear of the electrodes that can reduce the charge capacity and hence cycle life of the electrodes.

Embodiments of semi-solid electrodes described herein include a small quantity of a polymer additive, for example, a polymer or a gel polymer in the semi-solid electrode slurry composition. Gel polymers are compositions that include a monomer such as, for example, an acrylate or methacrylate based monomer dissolved in an appropriate solvent such as, for example, a non aqueous electrolyte. The monomer can be polymerized such as, for example, physically cross linked or chemically cross linked (e.g., through temperature or UV curing), such that the gel polymer solidifies into a gel. The amount of solidification or "gellation" is dependent on the quantity of polymer dissolved in the solvent, for example, a non-aqueous electrolyte. These gel polymers are used in some known lithium electrochemical cells in place of the non-aqueous liquid electrolyte. The central purpose of known gel polymers used in conventional electrochemical cells is to act as a solid phase electrolyte to provide mechanical integrity to the electrochemical cell and reduce leakage that can happen with liquid electrolytes. The quantity of polymer in the gel polymer additive included in the semi-solid electrodes described herein is defined such that the gel polymer additive does not lead to any significant gellation/solidification of the semi-solid slurry composition and also improves physical and/or electronic properties of the semi-solid slurry electrodes. Said another way, the gel polymer additive can improve the rheological properties of the semi-solid slurry electrodes for example, by inhibiting migration of active and/or conductive particles during cycling, without having any meaningful impact on the flowability of the semi-solid slurry. Furthermore, the small quantity of the gel polymer additive can enhance the cohesiveness of the semi-solid slurry such that the semi-solid slurry has a more stable and uniform viscosity and stiffness. This can improve the shape keeping ability of the semi-solid electrodes and prevent separation of the semi-solid anode and/or cathode. Moreover, any other polymers can also be used in the semi-solid electrodes described herein which can improve the rheological properties of the semi-solid electrode without having any meaningful impact on the electronic properties of the semi-solid slurry. In some embodiments, the polymer additive, for example, the gel polymer additive included in the semi-solid electrode can be cured. In some embodiments, the polymer additive included in the semi-solid electrode improves the rheological properties of the semi-solid electrodes without being cured.

Semi-solid electrodes described herein provide several advantages including; (1) longer cycle life, i.e. the charge capacity of electrochemical cells composed of the semi-solid electrodes described herein is retained for a greater number of charge/discharge cycles; (2) a significant portion of the semi-solid electrode energy efficiency is maintained; (3) area specific impedance (ASI) is lowered; (4) shape keeping ability of the semi-solid electrode is improved; and (5) separation of the semi-solid electrode slurry materials is substantially reduced or eliminated. In some embodiments, when a single ion transfer gel polymer additive is used, the semi-solid electrode polarization can be lowered which can yield semi-solid electrodes with higher electron conductivity and charge capacity (Ryu, et al., "Rate performance is strongly related to the electrode polarization by the limitation of Ohmic loss, energy transfer and mass transfer", *J. Echem. Soc. & Tech*, Vol. 2, No. 3, pp. 136-142 (2011)). Furthermore, semi-solid electrodes described herein can also have higher loading of ion-storing solid phase materials (e.g., active materials and/or conductive materials). Therefore, semi-solid electrodes described herein can have a higher charge capacity and higher energy density when compared to semi-solid electrodes that do not include a gel polymer additive.

In some embodiments, semi-solid electrodes described herein that include the polymer additive, for example, a gel polymer additive or any other polymer additive described herein can have reduced stiffness. The reduced stiffness can make it easier to manufacture static (i.e., stationary) or flowable semi-solid electrodes, for example, by making it easier to cast and/or flow the electrode composition. In particular, reduction in stiffness can also increase the flowability of semi-solid flowable electrodes which can reduce physical wear and tear of the semi-solid electrodes and increase cycle life.

In some embodiment, a semi-solid electrode can include about 20% to about 75% by volume of an active material, about 0.5% to about 25% by volume of a conductive material, and about 20% to about 70% by volume of an electrolyte. The electrolyte includes 0.01% to about 1.5% by weight of a polymer additive. In some embodiments, the electrolyte can include about 0.1% to about 1% by weight of the polymer additive.

In some embodiments, an energy storage device includes a positive current collector, a negative current collector and an ion permeable membrane disposed between the positive current collector and the negative current collector. The ion permeable membrane is spaced from the positive current collector and at least partially defines a positive electroactive zone. The ion permeable membrane is also spaced from the negative current collector and at least partially defines a negative electroactive zone. A semi-solid electrode is disposed in at least one of the positive electroactive zone and the negative electroactive zone. The semi-solid electrode includes a suspension of an ion-storing solid phase material in a non-aqueous electrolyte which includes about 0.01% to about 1.5% by weight of a polymer additive. In some embodiments, the volume percentage of the ion-storing solid phase material in the non-aqueous electrolyte can be between about 20% to about 75%.

In some embodiments, a method for preparing a semi-solid electrode includes combining a polymer additive with a non-aqueous liquid electrolyte to form a polymer-electrolyte mixture. An active material is combined with the polymer-electrolyte mixture to form an intermediate material. A conductive additive is then added to the intermediate material to form a semi-solid electrode material. The semi-solid electrode material is formed into an electrode. Optionally, the polymer additive can be cured. In some embodiments, the concentration of the polymer additive in the non-aqueous liquid electrolyte is in the range of about 0.01% to about 1.5% by weight.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in an electrolyte to produce a semi-solid electrode. Examples of battery architectures utilizing semi-solid flowable electrodes are described in U.S. Patent Application Publication No. 2011/0200848 (also referred to as "the '848 publication"), published Aug. 8, 2011, entitled "High Energy Density Redox Flow Device", and U.S. Pat. No. 8,722,226 (also referred to as "the '226 patent"), issued Aug. 18, 2011, entitled "High Energy Density Redox Flow Device", the entire disclosures of which are incorporated herein by reference in their entirety.

In some embodiments, semi-solid electrode compositions (also referred to herein as "semi-solid suspension" and/or "slurry") described herein can be mixed in a batch process e.g., with a batch mixer that can include, for example, a high shear mixture, a planetary mixture, a centrifugal planetary mixture, a sigma mixture, a CAM mixture, and/or a roller mixture, with a specific spatial and/or temporal ordering of component addition. In some embodiments, slurry components can be mixed in a continuous process (e.g. in an extruder), with a specific spatial and/or temporal ordering of component addition.

The mixing and forming of a semi-solid electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

In some embodiments, the process conditions can be selected to produce a prepared slurry having a mixing index of at least about 0.80, at least about 0.90, at least about 0.95, or at least about 0.975. In some embodiments, the process conditions can be selected to produce a prepared slurry having an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent shear rate of 1,000 s$^{-1}$. In some embodiments, the process conditions can be selected to produce a prepared slurry having two or more properties as described herein. Examples of systems and methods that can be used for preparing the semi-solid electrode compositions described herein are described in U.S. Patent Application Publication No. US 2013/0337319 (also referred to as "the '319 publication"), published Dec. 19, 2013, entitled "Electrochemical Slurry Compositions and Methods for Preparing the Same," the entire disclosure of which is hereby incorporated by reference.

As used herein, the term "about" and "approximately" generally mean plus or minus 10% of the value stated, e.g., about 250 µm would include 225 µm to 275 µm, about 1,000 µm would include 900 µm to 1,100 µm.

As used herein, the term "semi-solid" refers to a material that is a mixture of liquid and solid phases, for example, such as particle suspension, colloidal suspension, emulsion, gel, or micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles and through the thickness and length of the electrode. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

FIG. 1 shows a schematic illustration of an electrochemical cell 100. The electrochemical cell 100 includes a positive current collector 110, a negative current collector 120 and a separator 130 disposed between the positive current collector 110 and the negative current collector 120. The positive current collector 110 is spaced from the separator 130 by a first distance $t_1$ and at least partially defines a positive electroactive zone. The negative current collector 120 is spaced from the separator 130 by a second distance $t_2$ and at least partially defines a negative electroactive zone. A semi-solid cathode 140 is disposed in the positive electroactive zone and an anode 150 (e.g., semi-solid anode) is disposed in the negative electroactive zone. In some embodiments, the thickness of the positive electroactive zone defined by the distance $t_1$ and/or the thickness of the negative electroactive zone defined by the distance $t_2$ can be in range of about 250 µm to about 2,000 µm.

The semi-solid cathode 140 and/or anode 150 (e.g., semi-solid anode) can be disposed on a current collector, for example, coated, casted, drop coated, pressed, roll pressed, or deposited using any other suitable method. The semi-solid cathode 140 can be disposed on the positive current collector 110 and the anode 150 can be disposed on the negative current collector 120. For example the semi-solid cathode 140 and/or anode 150 (e.g., semi solid anode) can be coated, casted, calendered and/or pressed on the positive current collector 110 and the negative current collector 120, respectively. The positive current collector 110 and the negative current collector 120 can be any current collectors that are electronically conductive and are electrochemically inactive under the operating conditions of the cell. Typical current collectors for lithium cells include copper, aluminum, or titanium for the negative current collector 120 and aluminum for the positive current collector 110, in the form of sheets or mesh, or any combination thereof. In some embodiments, the semi-solid cathode 140 and/or anode 150 can be a flowable semi-solid electrode for use in a redox flow cell such as, for example, the semi-solid electrode compositions and redox flow cells that are described in the '848 publication and the '226 patent.

Current collector materials can be selected to be stable at the operating potentials of the semi-solid cathode 140 and anode 150 (e.g., semi-solid anode) of the electrochemical cell 100. For example, in non-aqueous lithium systems, the positive current collector 110 can include aluminum, or aluminum coated with conductive material that does not electrochemically dissolve at operating potentials of 2.5-5.0V with respect to Li/Li$^+$. Such materials include platinum, gold, nickel, conductive metal oxides such as vanadium oxide, and carbon. The negative current collector 120 can include copper or other metals that do not form alloys or intermetallic compounds with lithium, carbon, and/or coatings comprising such materials disposed on another conductor.

The semi-solid cathode 140 and the anode 150 (e.g., semi-solid anode) included in an electrochemical cell can be separated by a separator 130. For example, the separator 130 can be any conventional membrane that is capable of ion transport. In some embodiments, the separator 130 is a liquid impermeable membrane that permits the transport of ions therethrough, namely a solid or gel ionic conductor. In some embodiments the separator 130 is a porous polymer membrane infused with a liquid electrolyte that allows for the shuttling of ions between the semi-solid cathode 140 and the semi-solid anode 150 electroactive materials, while preventing the transfer of electrons. In some embodiments, the separator 130 is a microporous membrane that prevents particles forming the positive and negative electrode compositions from crossing the membrane. In some embodiments, the separator 130 is a single or multilayer microporous separator, optionally with the ability to fuse or "shut down" above a certain temperature so that it no longer transmits working ions, of the type used in the lithium ion battery industry and well-known to those skilled in the art. In some embodiments, the separator 130 can include a polyethyleneoxide (PEO) polymer in which a lithium salt is complexed to provide lithium conductivity, or Nafion™ membranes which are proton conductors. For example, PEO based electrolytes can be used as the separator 130, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

The cathode 140 can be a semi-solid stationary cathode or a semi-solid flowable cathode, for example of the type used in redox flow cells (e.g., redox flow cells described in the '848 publication and the '226 patent). The semi-solid cathode 140 can include an ion-storing solid phase material which can include, for example, an active material and/or a conductive material. The quantity of the ion-storing solid phase material can be in the range of about 0% to about 75% by volume. The cathode 140 can include an active material such as, for example, a lithium bearing compound (e.g., Lithium Iron Phosphate (LFP), $LiCoO_2$, $LiCoO_2$ doped with Mg, $LiNiO_2$, $Li(Ni, Co, Al)O_2$ (known as "NCA"), $Li(Ni, Mn, Co)O_2$ (known as "NMC"), $LiMn_2O_4$ and its derivatives, etc.). The cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys or combination thereof. The cathode 140 can also include a non-aqueous liquid electrolyte such as, for example, ethylene carbonate, dimethyl carbonate, diethyl carbonate, or any other electrolyte described herein or combination thereof.

In some embodiments, the anode 150 can be a semi-solid stationary anode. In some embodiments, the anode 150 can be a semi-solid flowable anode, for example, of the type used in redox flow cells (e.g., redox flow cells described in the '848 publication and the '226 patent).

In some embodiments, the semi-solid anode 150 can also include an ion-storing solid phase material which can include, for example, an active material and/or a conductive material. The quantity of the ion-storing solid phase material can be in the range of about 0% to about 80% by volume. In some embodiments, the quantity of the ion-storing solid phase material can be in the range of about 0% to about 75% by volume. The anode 150 can include an anode active material such as, for example, lithium metal, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

The anode 150 (e.g., a semi-solid anode) can also include a conductive material which can be a carbonaceous material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the anode 150 can also include a non-aqueous liquid electrolyte such as, for example, ethylene carbonate, dimethyl carbonate, diethyl carbonate, or any other electrolyte described herein or combination thereof.

In some embodiments, the semi-solid cathode 140 and/or the semi-solid anode 150 can include active materials and optionally conductive materials in particulate form suspended in a non-aqueous liquid electrolyte. In some embodiments, the semi-solid cathode 140 and/or the semi-solid anode 150 particles (e.g., cathodic or anodic particles) can have an effective diameter of at least about 1 µm. In some embodiments, the cathodic or anodic particles can have an effective diameter between about 1 µm and about 10 µm. In other embodiments, the cathodic or anodic particles can have an effective diameter of at least about 10 µm or more. In some embodiments, the cathodic or anodic particles can have an effective diameter of less than about 1 µm. In other embodiments, the cathodic or anodic particles can have an effective diameter of less than about 0.5 µm. In other embodiments, the cathodic or anodic particles can have an effective diameter of less than about 0.25 µm. In other embodiments, the cathodic or anodic particles can have an effective diameter of less than about 0.1 µm. In other embodiments, the cathodic or anodic particles can have an effective diameter of less than about 0.05 µm. In other embodiments, the cathodic or anodic particles have an effective diameter of less than about 0.01 µm.

In some embodiments, the semi-solid cathode 140 can include about 20% to about 80% by volume of an active material. In some embodiments, the semi-solid cathode 140 can include about 40% to about 75% by volume, about 50% to about 75% by volume, about 60% to about 75% by volume, or about 60% to about 80% by volume of an active material. In some embodiments, the semi-solid cathode 140 can include about 20% to about 75% by volume of an active material.

In some embodiments, the semi-solid cathode 140 can include about 0% to about 25% by volume of a conductive material. In some embodiments, the semi-solid cathode 140 can include about 1.0% to about 6% by volume, about 6% to about 12% or about 2% to about 15% by volume of a conductive material. In some embodiments, the semi-solid cathode 140 can include about 0.5% to about 20% by volume of a conductive material.

In some embodiments, the semi-solid cathode 140 can include about 20% to about 70% by volume of an electrolyte. In some embodiments, the semi-solid cathode 140 can include about 30% to about 60%, about 40% to about 50%, or about 20% to about 40% by volume of an electrolyte.

In some embodiments, the semi-solid cathode 140 can include about 20% to about 75% by volume of an active material, about 0.5% to about 20% by volume of a conductive material, and about 20% to about 70% by volume of an electrolyte.

In some embodiments, the semi-solid anode 150 can include about 20% to about 80% by volume of an active material. In some embodiments, the semi-solid anode 150 can include about 40% to about 75% by volume, about 50% to about 75%, about 60% to about 75%, or about 60% to about 80% by volume of an active material. In some embodiments, the semi-solid anode 150 can include about 10% to about 75% by volume of an active material.

In some embodiments, the semi-solid anode 150 can include about 0% to about 20% by volume of a conductive material. In some embodiments, the semi-solid anode 150 can include about 1% to about 10%, 1% to about 6%, about 0.5% to about 2%, about 2% to about 6%, or about 2% to about 4% by volume of a conductive material. In some embodiments, the semi-solid anode 150 can include about 0.5% to about 20% by volume of a conductive material.

In some embodiments, the semi-solid anode 150 can include about 20% to about 70% by volume of an electrolyte. In some embodiments, the semi-solid anode 150 can include about 30% to about 60%, about 40% to about 50%, or about 20% to about 40% by volume of an electrolyte.

Examples of active materials, conductive materials, and/or electrolytes that can be used in the semi-solid cathode 140 and/or the semi-solid anode 150 compositions, various formulations thereof, and electrochemical cells formed therefrom, are described in the '524 publication, the '848 publication, and the '226 patent.

In some embodiments, the semi-solid anode 150 can also include about 1% to about 30% by volume of a high capacity material. Such high capacity materials can include, for example, silicon, bismuth, boron, gallium, indium, zinc, tin, antimony, aluminum, titanium oxide, molybdenum, germanium, manganese, niobium, vanadium, tantalum, iron, copper, gold, platinum, chromium, nickel, cobalt, zirconium, yttrium, molybdenum oxide, germanium oxide, silicon oxide, silicon carbide, any other high capacity materials or alloys thereof, and any combination thereof. In some embodiments, the semi-solid anode can include about 1% to about 5% by volume, about 1% to about 10% by volume, about 1% to about 20%, or about 1% to about 30% by volume of the high capacity material. Examples of high capacity materials that can be included in the semi-solid anode 150, various formulations thereof and electrochemical cells formed therefrom, are described in the '606 application.

In some embodiments, the electrolyte included in at least one of the semi-solid cathode 140 and the semi-solid anode 150 can include about 0.01% to about 1.5% by weight of a polymer additive. In some embodiments, the electrolyte can include about 0.1% to about 1.25% by weight, about 0.1% to about 1% by weight of the polymer additive, about 0.1% to about 0.7% by weight, about 0.1% to about 0.5% by weight, or about 0.1% to about 0.3% by weight of the polymer additive. In some embodiments, the electrolyte can include about 0.01% to about 0.7% by weight, about 0.1% to about 0.7% by weight, about 0.3% to about 0.7% by weight, about 0.4% to about 0.6% by weight, about 0.45% to about 0.55% by weight, about 0.1% to about 0.5% by weight, about 0.3% to about 0.5% by weight, about 0.4% to about 0.5% by weight, about 0.1% to about 0.4% by weight, about 0.2% to about 0.4% by weight, about 0.1% to about 0.3% by weight, or about 0.1% to about 0.2% by weight of the polymer additive.

Various polymer additives can be included in the semi-solid electrode compositions described herein. In some embodiments, the polymer additive can include a gel polymer additive, for example, a physically cross linked gel polymer additive and/or a chemically cross linked gel polymer additive. In some embodiments, the gel polymer additive can include, for example, an acrylate or a methacrylate group including but not limited to poly(ethyleneglycol dimethacrylate), poly(ethyleneglycol diacrylate), poly(propyleneglycol dimethacrylate), poly(propyleneglycol diacrylate), and poly(methyl methacrylate) (PMMA). In some embodiments, the gel polymer additive can include the commercially available gel polymer additives ACG Elexcel™ and ERM-1 Elexcel™.

In some embodiments, the polymer additive can include carboxy methyl cellulose CMC, for example, a high molecular weight type CMC (e.g., MAC800LC™ available from Nippon Paper Chemicals Co. Ltd.), a medium molecular weight type CMC, or low molecular weight type CMC. Other examples of polymer additives can include poly (acrylonitrile) (PAN), polyurethane (PU), poly(vinylidene difluoride) (PVdF), poly(ethylene oxide) (PEO), poly(propylene oxide) poly(ethyleneglycol dimethylether), poly(ethyleneglycol diethylether), poly[bis(methoxy ethoxyethoxide)-phosphazene], poly(dimethylsiloxane) (PDMS), polyvinyl pyridine (PVP) and NIPPON SHOKUBAI® polymer. In some embodiments, the polymer additive can include a PEO copolymer having the following chemical formula:

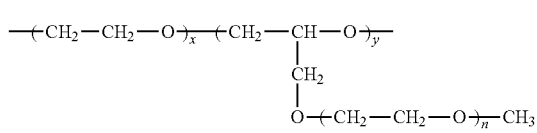

which is available from Daiso Chemical Company (also referred to herein as the "Daiso Polymer I"). In some embodiments, the polymer additive can include a PEO terpolymer having the following chemical formula:

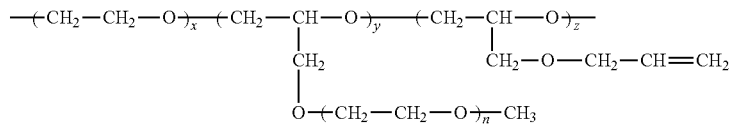

which is also available from Daiso Chemical Company (also referred to herein as the "Daiso Polymer II").

In some embodiments, the polymer additive can include an electron conductive polymer such as, for example, polyaniline or polyacetylene based conductive polymers or poly (3,4-ethylenedioxythiophene) (PEDOT), polydisulfide, polythione, polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, polystyrene sulfonate, ferrocene-substituted polyethylene, carbazole-substituted polyethylene, polyoxyphenazine, polyacenes, or poly(heteroacenes).

In some embodiments, the polymer additive can include a single-ion transfer polymer (also known as "single ion conductor polymer" or "anion receptive polymer") such as, for example, a polysulfone or polyether based gel polymer additive. Examples of single ion transfer polymer additives include, for example, poly[(4-styrenesulfonyl)(trifluoromethanesulfonyl)imide-co-methoxy-polyethyleneglycolacrylate] (Li[PSTFSI-co-MPEGA]), sulfonated poly(phenylene oxide) (PPO), N,N-dimethylacryl amide (DMAAm), and lithium 2-acrylamido-2-methyl-1-propane sulfonate (LiAMPS), Poly(lithium 2-Acrylamido-2-Methylpropane-sulfonic Acid-Co-Vinyl Triethoxysilane).

In some embodiments, the polymer additive can also include a li-ion redox polymer such as, for example, polyethyleneoxide (PEO)/poly(lithium sorbate), PEO/poly (lithium muconate), PEO/[poly(lithium sorbat)+BF$_3$], or any other li-ion redox polymer or combination thereof.

In some embodiments, the polymer additive can be in the form of an oil or grease. In such embodiments, the polymer additive can include for example, silicone oil, polytetrafluoroethylene (PTFE), perfluoropolyether (PFPE), chlorotrifluoroethylene (CTFE), methylphenyl silicone, methyhydrogen silicone, dimethyl silicone, methylphenyl silicone, cyclic-dimethyl silicone, CRC 2-26® lubricant, CONDUCTALUBE®, conductive grease, siloxane, or the likes.

In some embodiments, the polymer additive enables higher loading of active and/or conductive material in the semi-solid cathode 140 and/or the semi-solid anode 150. For example, the polymer additive can facilitate the creation of a more stable percolation network of the conductive material, for example, an activated carbon network, that can enable higher loadings, for example, up to 80% loading of the active and/or conductive material. Therefore electrochemical batteries formed from the semi-solid electrodes described herein can have higher charge capacity and energy density.

As described herein, the polymer additive is formulated to enhance the rheological properties of the semi-solid cathode 140 and/or the semi-solid anode 150 without impacting the electronic performance of the cathode 140 and/or the anode 150, and the electrochemical cell formed therefrom. In some embodiments, polymer additive included in the cathode 140 and/or the anode 150 is not cured. In some embodiments, the polymer additive included in the cathode 140 and/or the anode 150 (e.g., a gel polymer additive) is cured, for example, via UV cross-linking, heating, chemical cross-linking, or any other suitable curing method.

In some embodiments, the cathode 140 and/or anode 150 semi-solid suspensions can initially be flowable, and can be caused to become non-flowable by "fixing". In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell 100 formed from a semi-solid cathode and/or semi-solid anode. In some embodiments, the semi-solid suspension can be fixed by heating. In some embodiments, one or more additives are added to the semi-solid suspensions to facilitate fixing.

In some embodiments, the injectable and flowable semi-solid cathode 140 and/or semi-solid anode 150 is caused to become non-flowable by "plasticizing". In some embodiments, the rheological properties of the injectable and flowable semi-solid suspension are modified by the addition of a thinner, a thickener, and/or a plasticizing agent. In some embodiments, these agents promote processability and help retain compositional uniformity of the semi-solid under flowing conditions and positive and negative electroactive zone filling operations. In some embodiments, one or more additives are added to the flowable semi-solid suspension to adjust its flow properties to accommodate processing requirements.

Systems employing negative and/or positive ion-storage materials that are insoluble storage hosts for working ions, meaning that said materials can take up or release the working ion while all other constituents of the materials remain substantially insoluble in the electrolyte, are particularly advantageous as the electrolyte does not become contaminated with electrochemical composition products. In addition, systems employing negative and/or positive lithium ion-storage materials are particularly advantageous when using non-aqueous electrochemical compositions.

In some embodiments, the semi-solid ion-storing redox compositions include materials proven to work in conventional lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte.

In some embodiment, the cathode 140 can be a semi-solid cathode and the anode 150 can be a conventional anode for example, a solid anode formed from the calendering process as is commonly known in the arts. In some embodiments, the cathode 140 can be a semi-solid cathode and the anode 150 can also be a semi-solid anode as described herein. In some embodiments, the cathode 140 and the anode 150 can both be semi-solid flowable electrodes, for example, for use in a redox flow cell examples of which are described in the '848 publication and the '226 patent.

Figure 2:
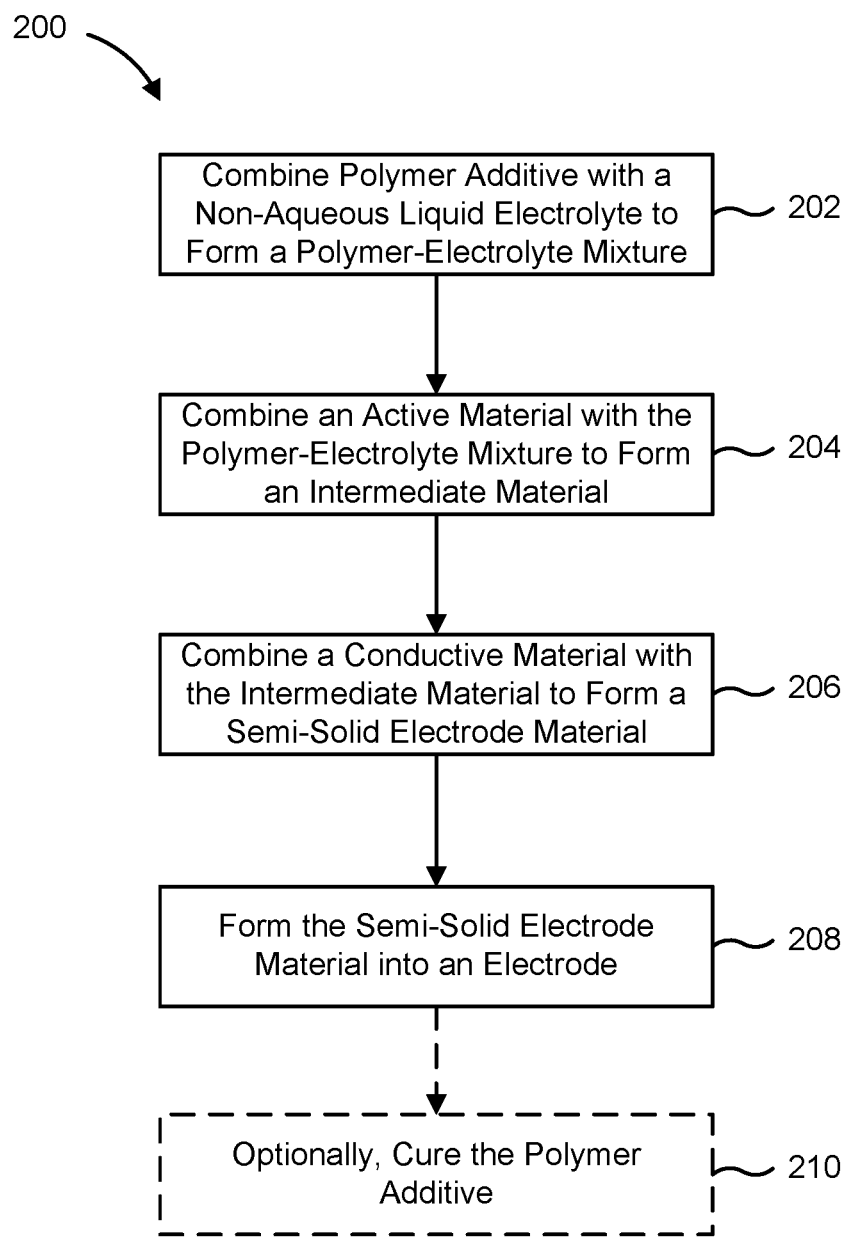
FIG. 2 is a schematic flow diagram of a method for preparing a semi-solid electrode slurry, according to an embodiment.

FIG. 2 illustrates a flow diagram showing a method 200 for preparing a semi-solid electrode, for example, the semi-solid cathode 140 and/or the semi-solid anode 150 described herein with reference to FIG. 1. The method 200 includes combining a polymer additive with a non-aqueous liquid electrolyte to form a polymer-electrolyte mixture, at 202. The polymer additive can include any of the polymer additives described herein. The electrolyte can include ethylene carbonate, dimethyl carbonate, diethyl carbonate, or any other electrolyte described herein or combination thereof. The quantity of the polymer additive in the non-aqueous electrolyte can be in the range of about 0.01% to about 1.5% by weight of the non-aqueous electrolyte, for example, about 0.1% of about 1% by weight, about 0.1% to about 0.7% by weight of the non-aqueous electrolyte, or any other concentration range described herein. The mixing of the polymer additive and the non-aqueous electrolyte can be performed with continuous agitation, for example, constant stirring using a magnetic stirrer, a mechanical stirrer, constant vibrations on a shaker table, or any other suitable agitation mechanism. The mixing is performed until the polymer additive completely dissolves in the non-aqueous electrolyte such as, for example, a period of 24 hours or any other suitable time period.

An active material is combined with the polymer-electrolyte mixture and mixed to form an intermediate material, at 204. The active material can include any of the active materials described herein in any suitable concentration range as described herein. A conductive material is then combined with the intermediate material and mixed to form a semi-solid electrode material, at 206. Mixing the conductive material with the intermediate material after the active material and the polymer-electrolyte mixture are mixed together to form the intermediate material, can enable the formation of stable percolation networks in the semi-solid electrode material. Stable percolation networks can, for example, enhance the conductivity of the semi-solid electrodes and yield a stable and more flowable semi-solid suspension. In some embodiments, no conductive material is added to the intermediate material, such that mixing of the active material with the polymer-electrolyte mixture yields the semi-solid electrode material.

The mixing of the semi-solid electrode material can be performed using any suitable mixing equipment such as, for example, a high shear mixture, a planetary mixture, a centrifugal mixture, a sigma mixture, a CAM mixture and/or a roller mixture. The mixing time and mixing speed are controlled such that a predetermined specific energy, for example, in the range of about 90 J/g to about 120 J/g is imparted to the semi-solid electrode material. The semi-solid electrode material can be mixed until a relatively stable suspension or slurry forms. Such a stable suspension can have a mixing index of at least about 0.80. In some embodiments, the slurry components can be mixed in a batch process using a batch mixer such as, for example, any of the mixing equipment described herein maintaining a specific spatial and/or temporal ordering of the component addition as described herein. In some embodiments, the slurry components can be mixed in a continuous process (e.g., in an extruder), with a specific spatial and/or temporal ordering of component addition.

In some embodiments, the process conditions can be selected to produce a prepared slurry having an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent shear rate of 1,000 $s^{-1}$. In some embodiments, the process conditions can be selected to produce a prepared slurry having two or more properties as described herein. Examples of mixing equipment that can be used to form the semi-solid electrode suspensions described herein, as well as various mixing parameters are described in the '319 publication.

After the mixing is performed to form the semi-solid electrode material that has the desired electronic and mechanical properties as described herein, the semi-solid electrode material is formed into an electrode, at 208. In some embodiments, the electrode can be a stationary or fixed electrode, for example, the electrode can be calendar roll formed, stamped and/or pressed, subjected to vibrational settling, and/or cut in discrete sections. In some embodiments, the electrode can be a flowable semi-solid electrode for use in a redox flow cell (e.g., the redox flow cells described in the '753 and the '226 patent). Additionally, in some embodiments, unwanted portions of material can be removed (e.g., masking and cleaning) and optionally recycled back into the slurry manufacturing process.

Optionally, the polymer additive mixed in with the electrode can be cured, at 210. For example, the polymer additive can include a gel polymer additive which can be cured. In some embodiments curing includes maintaining the formed electrode at room temperature, for example, at about 25 degrees Celsius, for at least about 24 hour, or at least about 72 hours. In some embodiments, the gel polymer additive can be cured at a temperature of at least about 65 degrees Celsius for a period of at least about 24 hours, for example, about 72 hours. The semi-solid electrode that includes the polymer additive as formed by the method described herein can have better workability and/or flowability than semi-solid electrodes that do not include the gel polymer additive. For example, the semi-solid electrodes described herein can have a lower stiffness than semi-solid electrodes that do not include gel polymer additive.

The following examples show the electronic performance and mechanical properties of various electrochemical cells that include the semi-solid electrodes described herein. Each of the electrochemical cells described in the following examples was tested for cycle life. Various electronic parameters of the electrochemical cells described in the following examples were measured as parameters of cycle life, including charge capacity retention, energy efficiency, ASI and normalized charge capacity at various charge/discharge rates. Furthermore, examples that include polymer additive in the semi-solid cathode and/or the semi-solid anode formulation were also tested for stiffness as a parameter of workability or flowability of the semi-solid electrodes. These examples are only for illustrative purposes and are not intended to limit the scope of the present disclosure.

Comparative Example 1

Figure 6:
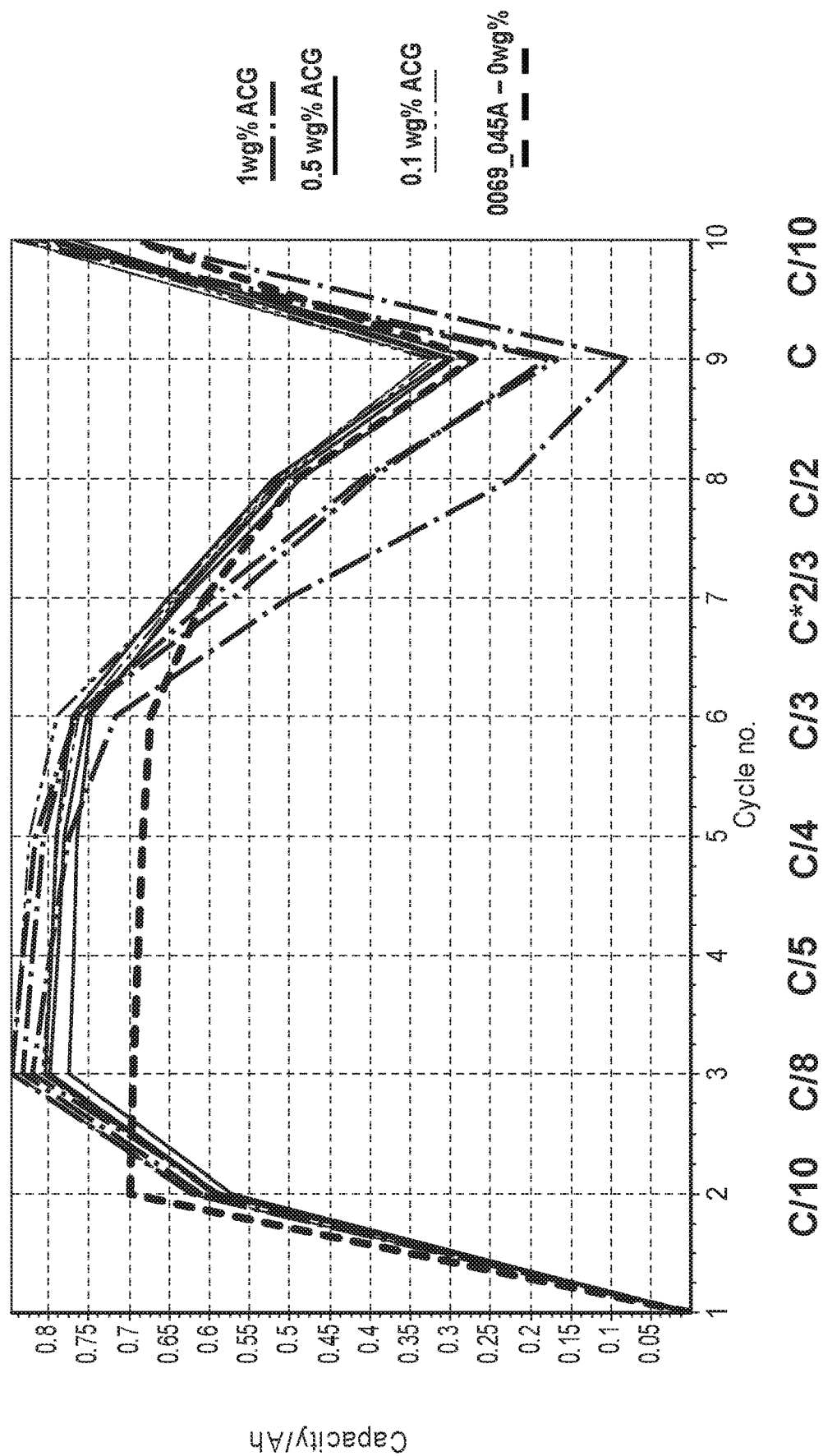
FIG. 6 is a plot of normalized charge capacity of various electrochemical cells at different charge rates after 10 charge cycles.
Figure 7:
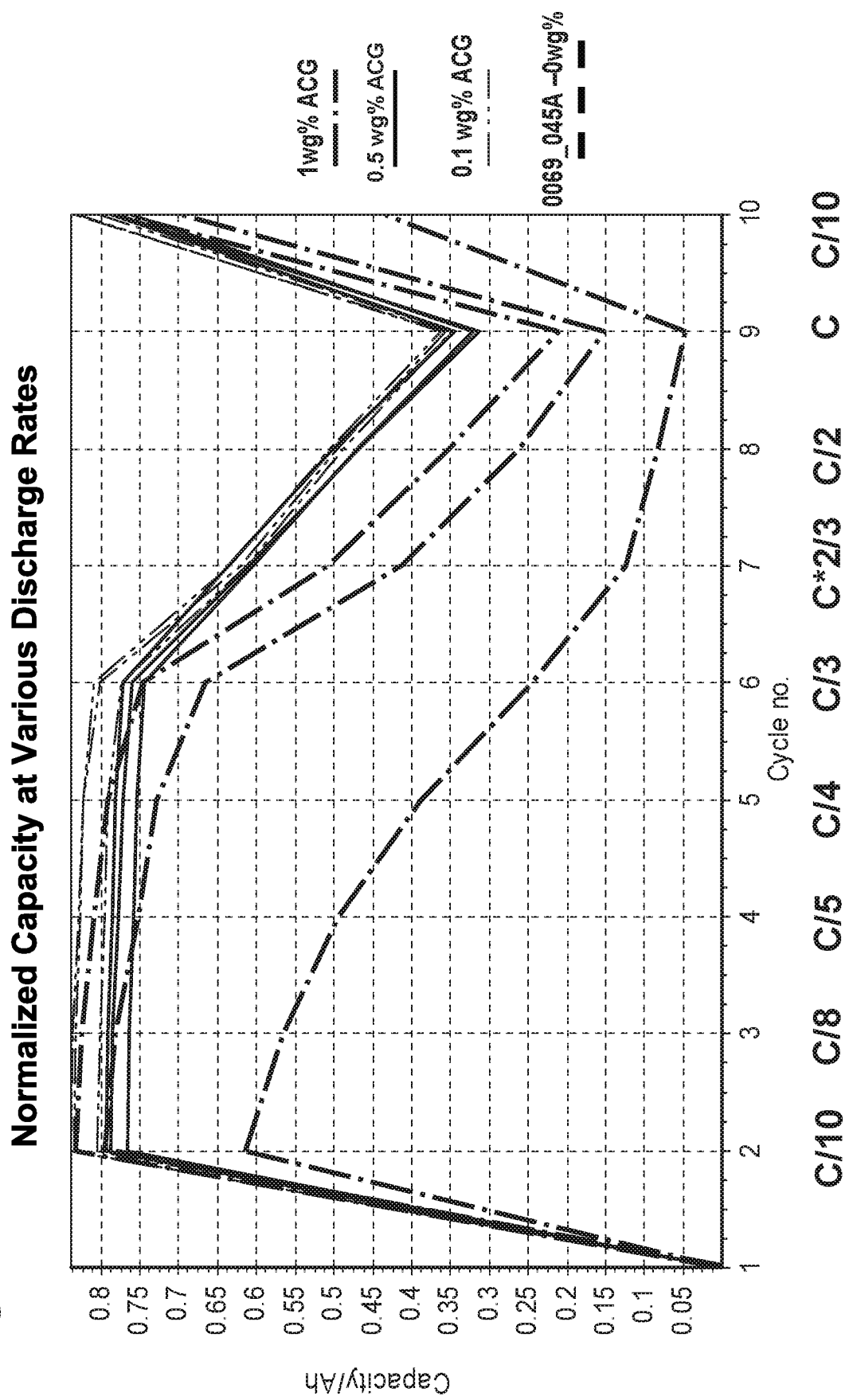
FIG. 7 is a plot of normalized discharge capacity of the electrochemical cells at different discharge rates after 10 discharge cycles.

An electrochemical cell comparative example 1 (also referred to as "Comp. Ex. 1") was prepared from a semi-solid cathode and a semi-solid anode. The semi solid cathode was prepared by mixing about 40% LFP by volume, with about 2% Ketjen by volume and about 58% by volume of SSDE electrolyte. The semi-solid anode was prepared by mixing about 35% PGPT by volume, with about 2% C45 by volume and about 63% by volume of SSDE electrolyte. The semi-solid cathode and semi-solid anode slurries were prepared using a batch mixer fitted with roller blades. Mixing was performed at about 100 rpm for about 4 minutes. Each of the semi-solid cathode and the semi-solid anode had a thickness of about 500 μm. The cell was tested using a Maccor battery tester and was cycled over a voltage range of V=2-3.9 V performed at about 25 degrees Celsius. As shown in FIG. 6 and FIG. 7, the Comp. Ex. 1 electrochemical cell has a normalized charge capacity of about 0.5 at a C/2 charge rate over 10 charge cycles, and a normalized charge capacity of about 0.47 at a C/2 discharge charge rate over 10 discharge cycles.

Comparative Example 2

An electrochemical cell comparative example 2 (also referred to as "Comp. Ex. 2") was prepared from a semi-solid cathode and a semi-solid anode. The semi solid cathode was prepared by mixing about 40% LFP by volume, with about 2% Ketjen by volume and about 58% by volume of SSDE electrolyte. The electrolyte included about 5% by volume of the ACG Elexcel™ gel polymer additive. The semi-solid anode was prepared by mixing about 35% PGPT400 by volume, with about 2% C45 by volume and about 63% by volume of SSDE electrolyte. The anode electrolyte also included about 5% by volume of the ACG Elexcel™ gel polymer additive. The cathode slurry was prepared using a batch mixer fitted with roller blades. Mixing was performed at about 100 rpm for about 4 minutes. Each of the semi-solid cathode and the semi-solid anode had a thickness of about 500 μm. After the semi-solid cathode and the semi-solid anode were formed, the gel polymer additive was cured at about 60 degrees Celsius for about 72 hours. The cell was tested using a Maccor battery tester and was cycled over a voltage range of V=2-3.9 V performed at about 25 degrees Celsius. The Comp. Ex. 2 electrochemical cell formed from the semi-solid electrodes that included about 5% by weight of the electrolyte of the gel polymer additive lost its entire charge capacity (data not shown) and therefore no further electronic measurements were conducted on the Comp. Ex. 2.

Comparative Example 3

An electrochemical cell comparative example 3 (also referred to as "Comp. Ex. 3") was prepared from a semi-solid cathode and a semi-solid anode. The semi solid cathode was prepared by mixing about 40% LFP by volume, with about 2% Ketjen by volume and about 58% by volume of SSDE electrolyte. The electrolyte included about 3% by volume of the ACG Elexcel™ gel polymer additive. The semi-solid anode was prepared by mixing about 35% PGPT400 by volume, with about 2% C45 by volume and about 63% by volume of SSDE electrolyte. The anode electrolyte also included about 3% by volume of the ACG Elexcel™ gel polymer additive. The cathode slurry was prepared using a batch mixer fitted with roller blades. Mixing was performed at about 100 rpm for about 4 minutes. Each of the semi-solid cathode and the semi-solid anode had a thickness of about 500 μm. After the semi-solid cathode and the semi-solid anode were formed, the gel polymer additive was cured at about 60 degrees Celsius for about 72 hours. The cell was tested using a Maccor battery tester and was cycled over a voltage range of V=2-3.9 V performed at about 25 degrees Celsius. The Comp. Ex. 3 electrochemical cell formed from the semi-solid electrodes that included about 3% by weight of the electrolyte of the gel polymer additive lost its entire charge capacity (data not shown) and therefore no further electronic measurements were conducted on the Comp. Ex. 3.

Example 1

Figure 3:
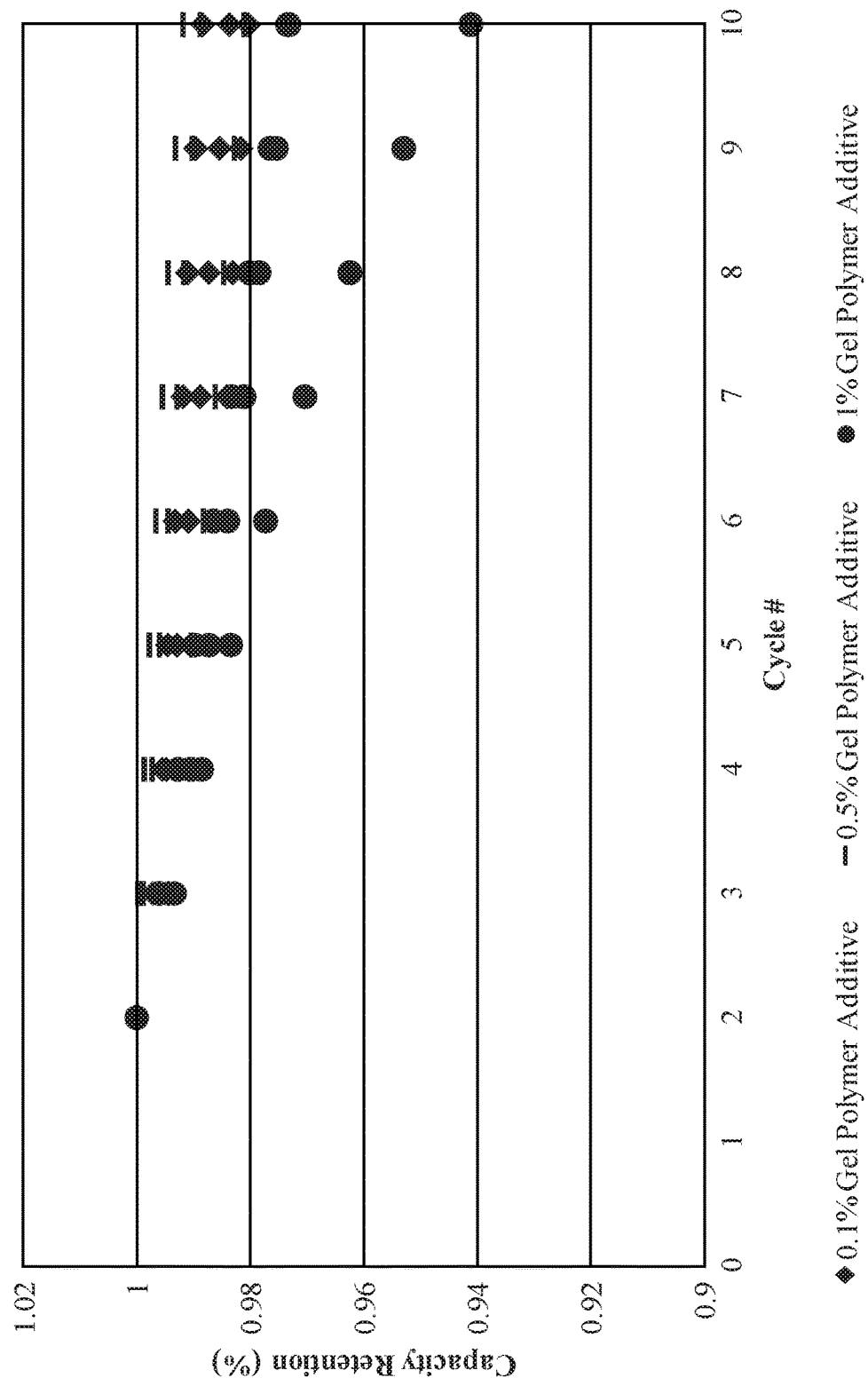
FIG. 3 is a plot of charge capacity retained by electrochemical cells that include various quantities of gel polymer additive in a semi-solid anode and a semi-solid cathode after 12 charge and discharge cycles.
Figure 4:
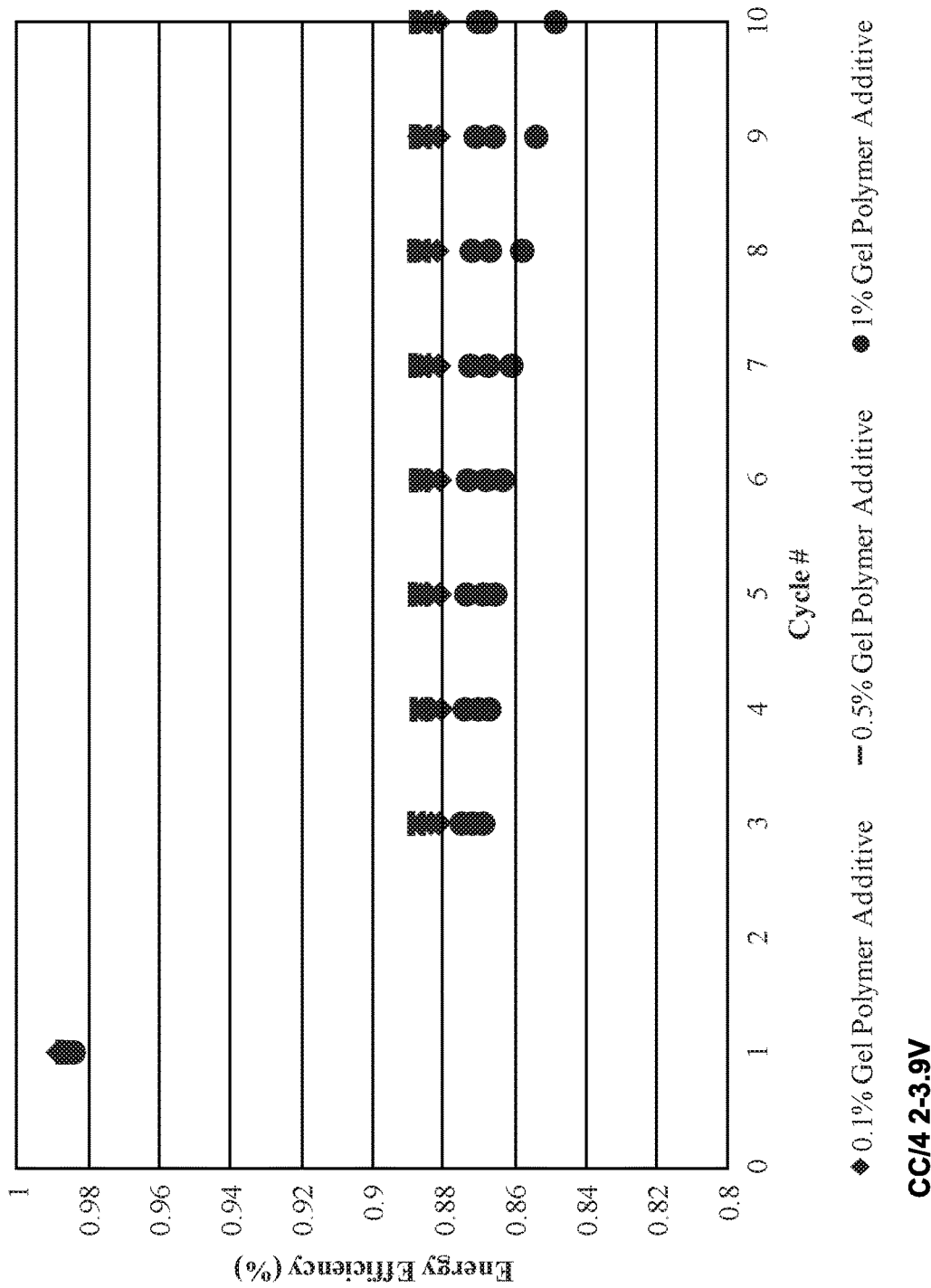
FIG. 4 is a plot of energy efficiency of the electrochemical cells of FIG. 3 after 12 charge and discharge cycles.
Figure 5:
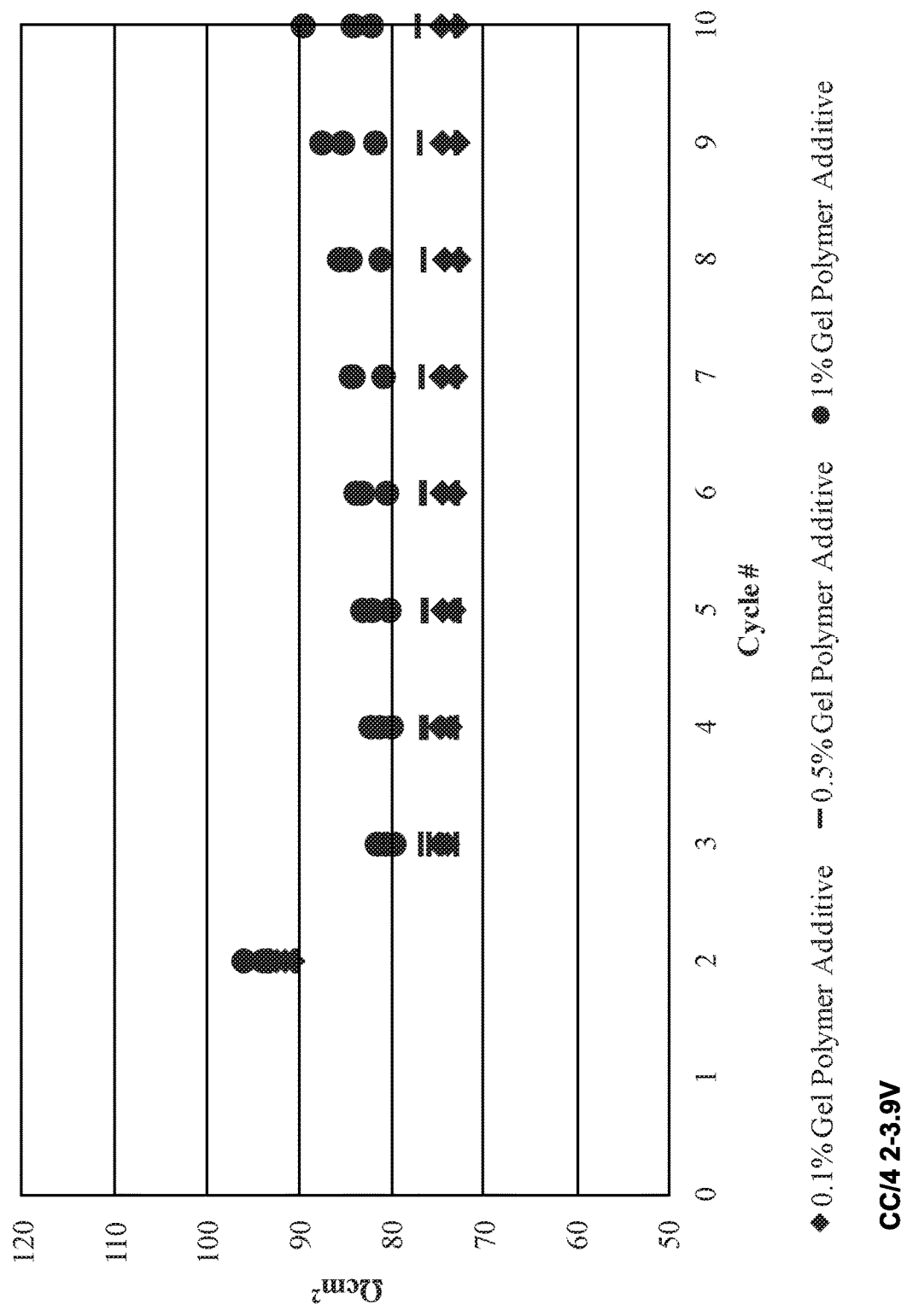
FIG. 5 is a plot of area specific impedance of the electrochemical cells of FIG. 3 after 12 charge and discharge cycles.

An electrochemical cell example 1 (also referred to as "Ex. 1") was prepared from a semi-solid cathode and a semi-solid anode. The semi solid cathode was prepared by mixing about 40% LFP by volume, with about 2% Ketjen by volume and about 58% by volume of SSDE electrolyte. The electrolyte includes about 1% by weight of the ACG Elexcel™ gel polymer additive. The semi-solid anode was prepared by mixing about 35% PGPT by volume, with about 2% C45 by volume and about 63% by volume of SSDE electrolyte. The electrolyte included about 1% by weight of the ACG Elexcel™ gel polymer additive. The cathode slurry was prepared using a batch mixer fitted with roller blades. Mixing was performed at about 100 rpm for about 4 minutes. Each of the semi-solid cathode and the semi-solid anode had a thickness of about 500 μm. The cell was tested using a Maccor battery tester and was cycled over a voltage range of V=2-3.9 V performed at about 25 degrees Celsius. As shown in FIG. 3 the Ex. 1 electrochemical cell retained about 93% of its initial charge capacity after 12 charge/discharge cycles. As shown in FIG. 4, the Ex. 1 electrochemical cell retained about 84% of its energy efficiency after 12 charge/discharge cycles. As shown in FIG. 5, the initial ASI of the Ex. 1 electrochemical cell was about 95 ohm-$cm^2$. The ASI dropped to about 80 ohm-$cm^2$ after the first charge/discharge cycle but rose again to about 91 ohm-$cm^2$ after 12 charge/discharge cycles. As shown in FIG. 6 and FIG. 7, the Ex. 1 electrochemical cell had a normalized charge capacity of about 0.24 at a C/2 charge rate over 10 charge cycles, and a normalized charge capacity of about 0.09 at a C/2 discharge rate over 10 discharge cycles.

Figure 8:
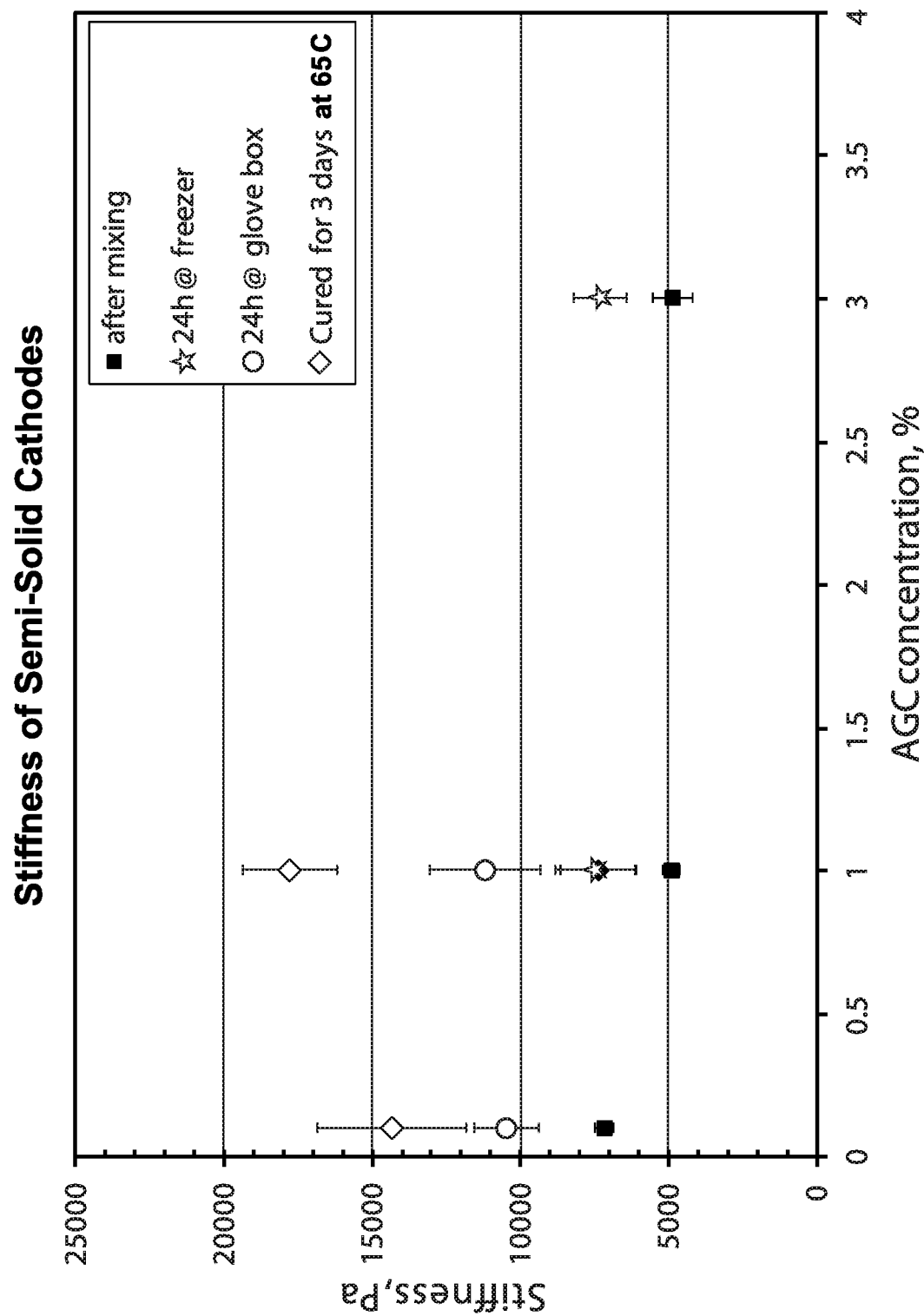
FIG. 8 is a plot of the stiffness of semi-solid cathodes included in the electrochemical cells of FIG. 3 after mixing and after curing under various curing conditions.
Figure 9:
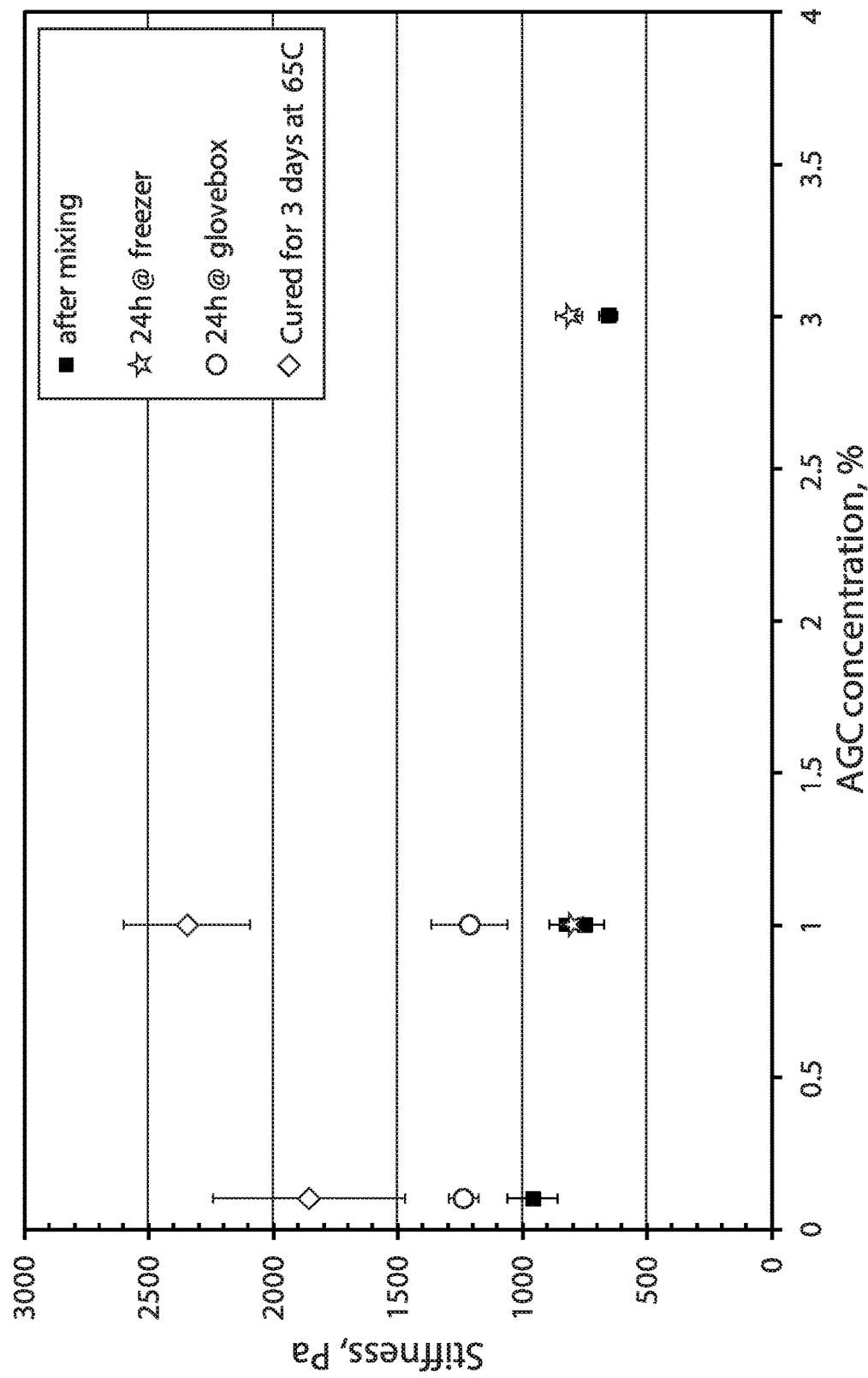
FIG. 9 is a plot of the stiffness of semi-solid anodes included in the electrochemical cells of FIG. 3 after mixing and after curing under various curing conditions.

Stiffness of the each of the semi-solid cathode and the semi-solid anode included in the Ex. 1 electrochemical cell were also tested as a measure of electrode workability and flowability. The stiffness was measured after mixing of the electrode and is shown in FIG. 8. The gel polymer additive included in each of the semi-solid anode and the semi-solid cathode was cured at three different conditions; (1) in a freezer that had a temperature of about +4 degrees Celsius for about 24 hours; (2) in a glove box at room temperature, i.e. about 25 degrees Celsius for about 24 hours; and (3) at about 65 degrees Celsius for about 3 days (72 hours). The stiffness of each of the semi-solid cathode and semi-solid anode included in the Ex. 1 electrochemical cell was also measured after each of the curing conditions and is shown in FIG. 9. As shown in FIG. 8 and FIG. 9, the semi-solid cathode included in Ex. 1 had a stiffness of about 5,000 Pa after mixing, while the semi-solid anode had a stiffness of about 700 Pa after mixing. The semi-solid cathode cured for 24 hours in the freezer had a stiffness of about 7,000 Pa. The semi-solid cathode cured for 24 hours at room temperature had a stiffness of about 11,000 Pa, while the semi-solid cathode cured for 72 hours at about 65 degrees Celsius had a stiffness of about 18,000 Pa. The semi-solid anode cured for 24 hours in the freezer had a stiffness of about 700 Pa. The semi-solid anode cured for 24 hours at room temperature had a stiffness of about 1,200 Pa, while the semi-solid anode cured for 72 hours at about 65 degrees Celsius had a stiffness of about 2,300 Pa.

Example 2

An electrochemical cell example 2 (also referred to as "Ex. 2") was prepared from a semi-solid cathode and a semi-solid anode. The semi solid cathode was prepared by mixing about 40% LFP by volume, with about 2% Ketjen by volume, and about 58% by volume of SSDE electrolyte. The electrolyte includes about 0.5% by weight of the ACG Elexcel™ gel polymer additive. The semi-solid anode was prepared by mixing about 35% PGPT by volume, with about 2% C45 by volume and about 63% by volume of SSDE electrolyte. The electrolyte included about 0.5% by weight of the ACG Elexcel™ gel polymer additive. The cathode slurry was prepared using a batch mixer fitted with roller blades. Mixing was performed at about 100 rpm for about 4 minutes. Each of the semi-solid cathode and the semi-solid anode had a thickness of about 500 μm. The cell was tested using a Maccor battery tester and was cycled over a voltage range of V=2-3.9 V performed at about 25 degrees Celsius. As shown in FIG. 3 the Ex. 2 electrochemical cell retained about 98% of its initial charge capacity after 12 charge/discharge cycles. As shown in FIG. 4, the Ex. 2 electrochemical cell retained about 89% of its energy efficiency after 12 charge/discharge cycles. As shown in FIG. 5, the initial ASI of the Ex. 2 electrochemical cell was about 93 ohm-$cm^2$. The ASI dropped to about 75 ohm-$cm^2$ after the first charge/discharge cycle and remained the same even after 12 charge/discharge cycles. As shown in FIG. 6 and FIG. 7, the Ex. 2 electrochemical cell had a normalized charge capacity of about 0.5 at a C/2 charge rate over 10 charge cycles, and a normalized charge capacity of also about 0.5 at a C/2 discharge rate over 10 discharge cycles.

Example 3

An electrochemical cell example 3 (also referred to as "Ex. 3") was prepared from a semi-solid cathode and a semi-solid anode. The semi solid cathode was prepared by mixing about 40% LFP by volume, with about 2% Ketjen by volume and about 58% by volume of SSDE electrolyte. The electrolyte includes about 0.1% by weight of the ACG Elexcel™ gel polymer additive. The semi-solid anode was prepared by mixing about 35% PGPT by volume, with about 2% C45 by volume and about 63% by volume of SSDE electrolyte. The electrolyte include about 0.1% by weight of the ACG Elexcel™ gel polymer additive. The cathode slurry was prepared using a batch mixer fitted with roller blades. Mixing was performed at about 100 rpm for about 4 minutes. Each of the semi-solid cathode and the semi-solid anode had a thickness of about 500 μm. The cell was tested using a Maccor battery tester and was cycled over a voltage range of V=2-3.9 V performed at about 25 degrees Celsius. As shown in FIG. 3 the Ex. 3 electrochemical cell retained about 98% of its initial charge capacity after 12 charge/discharge cycles. As shown in FIG. 4, the Ex. 3 electrochemical cell retained about 89% of its energy efficiency after 12 charge/discharge cycles. As shown in FIG. 5, the initial ASI of the Ex. 3 electrochemical cell was about 92 ohm-cm$^2$. The ASI dropped to about 75 ohm-cm$^2$ after the first charge/discharge cycle and remained at about 75 ohm-cm$^2$ after 12 charge/discharge cycles. As shown in FIG. 6 and FIG. 7, the Ex. 3 electrochemical cell had a normalized charge capacity of about 0.5 at a C/2 charge rate over 10 charge cycles, and a normalized charge capacity of also about 0.5 at a C/2 discharge rate over 10 discharge cycles.

Stiffness of the each of the semi-solid cathode and the semi-solid anode included in the Ex. 5 electrochemical cell were also tested as a measure of electrode workability and flowability. The stiffness was measured after mixing of the electrode and is shown in FIG. 8. The gel polymer additive included in each of the semi-solid anode and the semi-solid cathode was then cured at three different conditions; (1) in a freezer that had a temperature of about +4 degrees Celsius for about 24 hours; (2) In a glove box at room temperature, i.e. about 25 degrees Celsius for about 24 hours and (3) at about 65 degrees Celsius for about 3 days (72 hours). The stiffness of each of the semi-solid cathode and semi-solid anode included in the Ex. 3 electrochemical cell was also measured after each of the curing conditions and is shown in FIG. 9. As shown in FIG. 8 and FIG. 9, the semi-solid cathode included in Ex. 3 had a stiffness of about 7,000 Pa after mixing, while the semi-solid anode had a stiffness of about 950 Pa after mixing. The semi-solid cathode cured for 24 hours in the freezer had a stiffness of about 7,000 Pa. The semi-solid cathode cured for 24 hours at room temperature had a stiffness of about 10,500 Pa, while the semi-solid cathode cured for 72 hours at about 65 degrees Celsius had a stiffness of about 14,500 Pa. The semi-solid anode cured for 24 hours in the freezer had a stiffness of about 900 Pa. The semi-solid anode cured for 24 hours at room temperature had a stiffness of about 1,250 Pa, while the semi-solid cathode cured for 72 hours at about 65 degrees Celsius had a stiffness of about 1,850 Pa.

The electronic performance parameters of each of the comparative examples, Ex. 1, Ex. 2 and Ex. 3 are summarized in Table 1.

TABLE 1

| | Quantity of Gel Polymer Additive (wt %) | Charge Retention after 12 cycles (%) | Energy Efficiency after 12 cycles (%) | ASI after 12 cycles Ω-cm$^2$ | Normalized Charge Capacity at C/2 Rate after 10 cycles | Normalized Discharge Capacity at C/2 Rate after 10 cycles |
|---|---|---|---|---|---|---|
| Comp. Ex. 1 | 0 | — | — | — | 0.5 | 0.47 |
| Comp. Ex. 2 | 5 | — | — | — | — | — |
| Comp. Ex. 3 | 3 | — | — | — | — | — |
| Ex. 1 | 1 | 93 | 84 | 91 | 0.24 | 0.09 |
| Ex. 2 | 0.5 | 98 | 89 | 75 | 0.5 | 0.5 |
| Ex. 2 | 0.1 | 98 | 89 | 75 | 0.5 | 0.5 |

The stiffness of the semi-solid cathode and the semi-solid anode included in each of comparative examples, Ex. 1, Ex. 2, and Ex. 3 electrochemical cells are summarized in Table 2.

TABLE 2

| | Semi-Solid Electrode | Quantity of Gel Polymer Additive (wt %) | Stiffness | | | |
|---|---|---|---|---|---|---|
| | | | After Mixing Pa | 24 Hours in Freezer Pa | 24 Hours at Room Temp. Pa | 72 Hours at 65 Degrees C. Pa |
| Comp. Ex. 1 | Cathode | 0 | — | — | — | — |
| | Anode | 0 | — | — | — | — |
| Comp. Ex. 2 | Cathode | 5 | — | — | — | — |
| | Anode | 5 | — | — | — | — |
| Comp. Ex. 3 | Cathode | 3 | 5,000 | 7,000 | — | — |
| | Anode | 3 | 650 | 700 | | |
| Ex. 1 | Cathode | 1 | 5,000 | 7,000 | 11,000 | 18,000 |
| | Anode | 1 | 700 | 700 | 1,200 | 2,300 |
| Ex. 2 | Cathode | 0.5 | — | — | — | — |
| | Anode | 0.5 | — | — | — | — |
| Ex. 3 | Cathode | 0.1 | 7,000 | 7,000 | 10,500 | 14,500 |
| | Anode | 0.1 | 950 | 900 | 1,250 | 1,850 |

Ex. 1 electrochemical cell retains a substantial amount of charge capacity and energy efficiency after 10 cycles but the cell impedance starts to increase. A significant reduction in the normalized charge and discharge capacity after 10 cycles was also observed. In contrast, the Ex. 2 electrochemical cell and Ex. 3 electrochemical cell retain a higher percentage of charge capacity and energy efficiencies in comparison to the Ex. 1 electrochemical cell. Ex. 2 and Ex. 3 also demonstrate a higher charge capacity and discharge capacity at the C/2-rate. Furthermore, the semi-solid cathode and semi-solid anode included in Ex. 3 have a lower stiffness than the semi-solid electrodes of Ex. 1 when cured at the 65 degrees Celsius for 72 hours, implying that the Ex. 3 semi-solid electrodes cured under these conditions can be more workable and more amenable to flow.

Electronic Performance of Electrochemical Cells Including Anodes that Include a Polymer Additive Various semi-solid anode formulations were prepared that included an uncured polymer additive and their electronic performance was compared to the electronic performance of a control anode that did not include the polymer additive.

A control semi-solid anode (also referred to as the "Control Anode") was prepared by mixing about 55% by volume of meso carbon microbeads (MGPA®) as the active material with about 1% by volume of C45 conductive material in an electrolyte. The electrolyte was formulated to include ethylene carbonate/gamma-butyrolactone in a ratio of 30:70, 1.1 M of $LiBF_4$ salt, about 2% by volume of vinylene carbonate and about 0.5% by volume of trioctyl phosphate The Control Anode slurry was prepared by mixing the components at about 650 rpm for about 6 minutes. The Control Anode had a thickness of about 300 μm.

A first semi-solid anode (also referred to as the "CMC Anode) was prepared substantially similar to the Control Anode, but now the electrolyte included about 1.5% by weight of a carboxymethyl cellulose (MAC800LC™ from Nippon Paper Chemicals Co. Ltd) polymer additive. The thickness of the CMC Anode was also about 300 μm.

A second semi-solid anode (also referred to as the "Daiso Anode) was prepared substantially similar to the Control Anode, but now the electrolyte included about 1.5% by weight of the DAISO polymer additive, as described before herein. The thickness of the Daiso Anode was also about 300 μm.

A third semi-solid anode (also referred to as the "Nippon Anode) was prepared substantially similar to the Control Anode, but now the electrolyte included about 1.5% by weight of a NIPPON SHOKUBAI® polymer additive. The thickness of the Nippon Anode was also about 300 μm.

Each of the semi-solid anodes were paired against a semi-solid cathode to form an electrochemical cell. The semi-solid cathode was formed by mixing about 50% by volume of LFP with about 0.8% by volume of Ketjen and an electrolyte. The electrolyte was formulated to include ethylene carbonate/gamma-butyrolactone in a ratio of 30:30, 1.1 M of $LiBF_4$ salt, about 2% by volume of vinylene carbonate and about 0.5% by volume of trioctyl phosphate. The semi-solid cathode slurry was prepared by mixing the components in a speed mixer at about 1250 rpm for about 90 seconds. The thickness of the cathode was about 300 μm.

Figure 10:
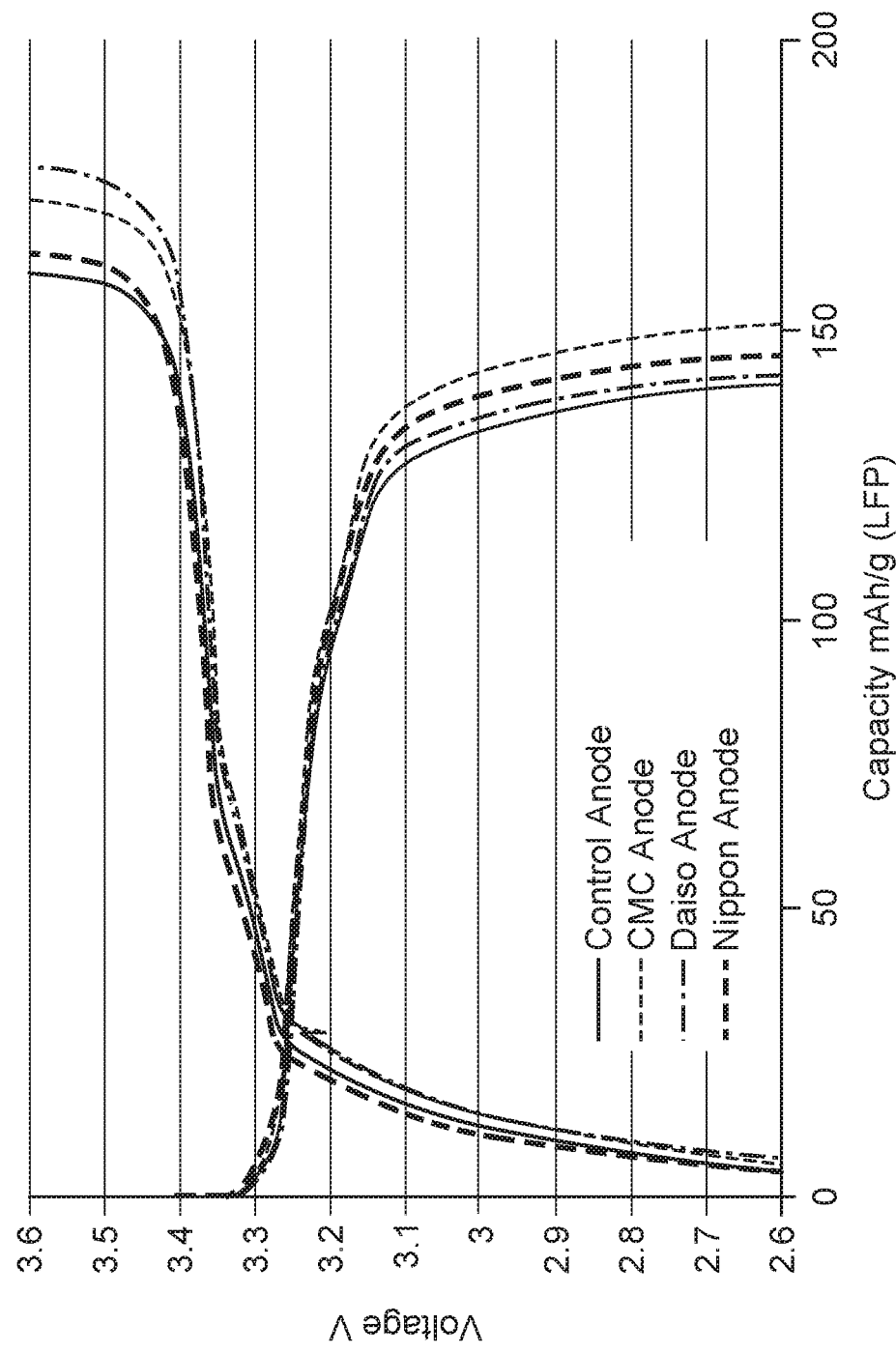
FIG. 10 is a plot of voltage vs capacity of an electrochemical cell that includes a control semi-solid anode compared with the voltage vs capacity plot of three electrochemical cells that include semi-solid anodes having a CMC polymer, a Daiso polymer, or a Nippon Shokubai polymer in the semi-solid anode formulation, at a C-rate of C/10.
Figure 11:
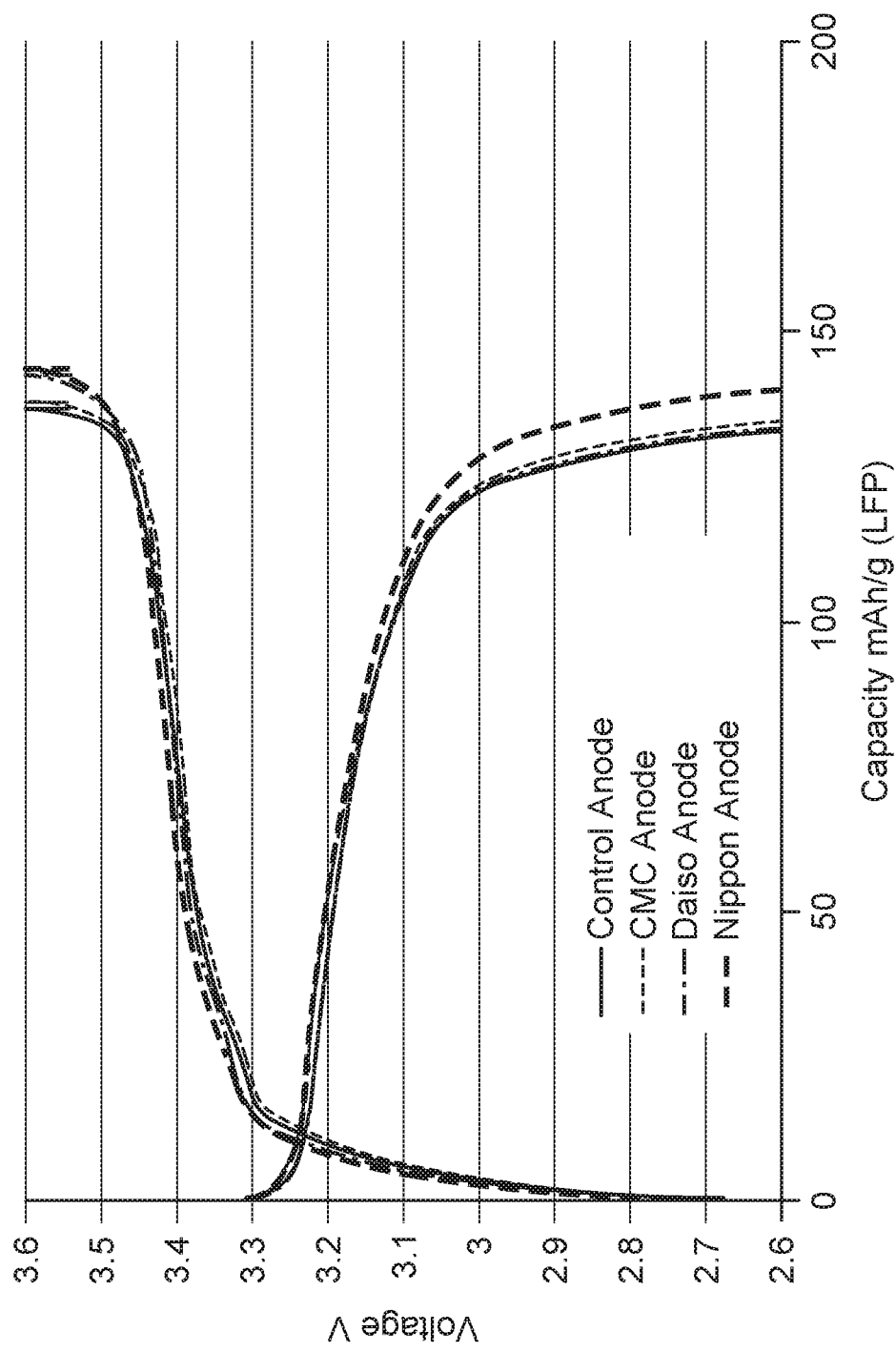
FIG. 11 is a plot of voltage vs capacity of the electrochemical cells of FIG. 10 at a C-rate of C/4.

Each of the electrochemical cells that include the semi-solid anodes and the semi-solid cathode were tested for two cycles at a C-rate of about C/10 and then for 10 cycles at a C-rate of C/4. FIG. 10 shows the voltage vs capacity profiles for the C/10 cycles, while FIG. 11 shows the voltage vs capacity profiles for the C/4 cycles. As shown, the voltage vs capacity profiles for each of the Control Anode, the CMC Anode, the Daiso Anode, and the Nippon Anode were substantially the same for each of the C/10 cycles as well as the C/4 cycles.

Figure 12:
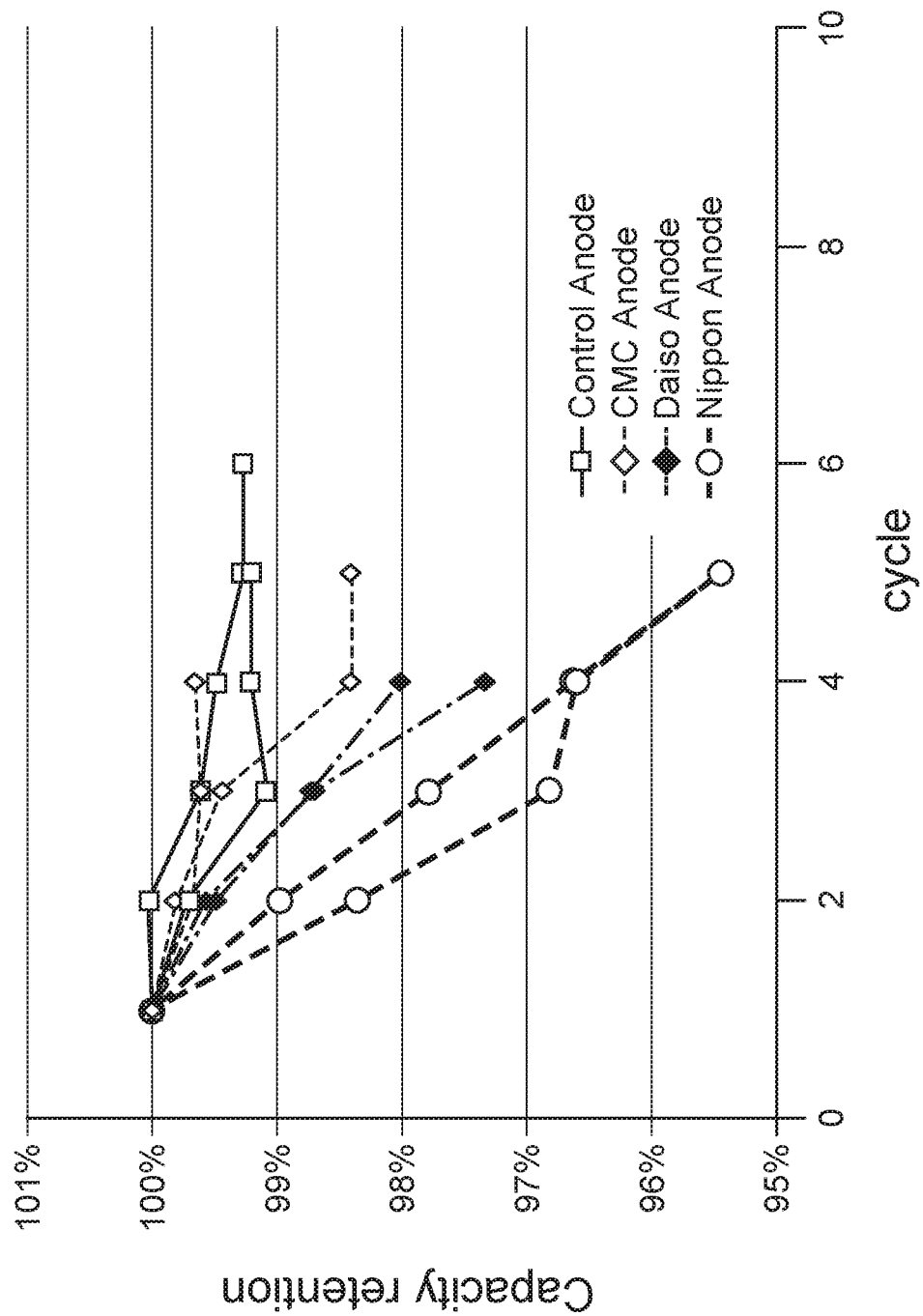
FIG. 12 is a plot showing the capacity retained by the electrochemical cells of FIG. 10 after 5 cycles.

Next, the capacity retention of each of the electrochemical cell after five charge/discharge cycles was measured. As shown in FIG. 12, the electrochemical cell that includes the Control Anode and the electrochemical cell that includes the CMC anode retain almost 99% of its initial capacity after 5 cycles. The electrochemical cell that includes the Daiso Anode retained about 97.5% of its initial capacity, while the Nippon Anode retained about 96% if it's initial capacity after 5 cycles.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. For example, the curing of the gel polymer additive can also be used to fix the semi-solid cathode and/or semi-solid anode. Additionally, certain of the steps may be performed concurrently in a parallel process when possible, as well as performed sequentially as described above. The embodiments have been particularly shown and described, but it will be understood that various changes in form and details may be made.

The invention claimed is:

1. A semi-solid electrode, comprising:
   about 20% to about 75% by volume of an active material; and
   about 20% to about 70% by volume of an electrolyte, the electrolyte including about 0.01% to 1.5% by weight of an additive formulated to modify the rheology of the semi-solid electrode,
   wherein a total additive content in the electrolyte is less than or equal to 1.5% by weight; and
   wherein the semi-solid electrode does not include a binder.

2. The semi-solid electrode of claim 1, wherein the electrolyte includes about 0.1% to about 1.25% by weight of the additive.

3. The semi-solid electrode of claim 2, wherein the electrolyte includes about 0.1% to about 1% by weight of the additive.

4. The semi-solid electrode of claim 3, wherein the electrolyte includes about 0.1% to about 0.7% by weight of the additive.

5. The semi-solid electrode of claim 4, wherein the electrolyte includes about 0.1% to about 0.5% by weight of the additive.

6. The semi-solid electrode of claim 5, wherein the electrolyte includes about 0.1% to about 0.3% by weight of the additive.

7. The semi-solid electrode of claim 1, wherein the additive is a gel-polymer additive.

8. The semi-solid electrode of claim 7, wherein the gel polymer additive includes at least one of a physically cross-linked gel polymer additive and a chemically cross-linked gel polymer additive.

9. The semi-solid electrode of claim 7, wherein the gel polymer additive includes at least one of an acrylate group and a methacrylate group.

10. The semi-solid electrode of claim 1, wherein the polymer additive is carboxy methyl cellulose.

11. The semi-solid electrode of claim 1, wherein the polymer additive includes at least one of a poly(ethyleneglycol dimethacrylate), poly(ethyleneglycol diacrylate), poly(propyleneglycol dimethacrylate), poly(propyleneglycol diacrylate), and poly(methyl methacrylate) (PMMA), polyethylene glycol dimethacrylate, poly(acrylonitrile) (PAN), polyurethane (PU), poly(vinylidene difluoride) (PVdF), poly(ethylene oxide) (PEO), poly(propylene oxide) poly(ethyleneglycol dimethyl ether), poly(ethyleneglycol diethylether), poly[bis(methoxy ethoxyethoxide)-phosphazene], poly(dimethylsiloxane) (PDMS), polyacene, polydisulfide, polystyrene, polystyrene sulfonate, polypyrrole, polyaniline, polythiophene, polythione, polyvinyl pyridine (PVP), polyvinyl chloride (PVC), polyaniline, poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, poly(heteroacene), poly[(4-styrenesulfonyl)(trifluoromethanesulfonyl)imide-co-methoxy-polyethyleneglycolacrylate] (Li[PSTFSI-co-MPEGA]), sulfonated poly(phenylene oxide) (PPO), N,N-dimethylacryl amide (DMAAm), and lithium 2-acrylamido-2-methyl-1-propane sulfonate (LiAMPS), Poly(lithium 2-Acrylamido-2-Methyl-propanesulfonic Acid-Co-Vinyl Triethoxysilane), polyethyleneoxide (PEO)/poly(lithium sorbate), PEO/poly(lithium muconate), PEO/[poly(lithium sorbat)+BF$_3$], PEO copolymer, and PEO terpolymer poly.

12. A semi-solid electrode, comprising:
about 10% to about 75% by volume of an active material;
0% to about 20% by volume of a conductive material; and
about 20% to about 70% by volume of an electrolyte, the electrolyte including about 0.01% to 1.5% by weight of an additive formulated to modify the rheology of the semi-solid electrode,
wherein a total additive content in the electrolyte is less than or equal to 1.5% by weight; and
wherein the semi-solid electrode does not include a binder.

13. The semi-solid electrode of claim 12, wherein the semi-solid electrode further includes about 1% to about 30% by volume of a high capacity material.

14. The semi-solid electrode of claim 12, wherein the electrolyte includes about 0.1% to about 1% by weight of the additive.

15. The semi-solid electrode of claim 12, wherein the additive includes at least one of a poly(ethyleneglycol dimethacrylate), poly(ethyleneglycol diacrylate), poly(propyleneglycol dimethacrylate), poly(propyleneglycol diacrylate), and poly(methyl methacrylate) (PMMA), polyethylene glycol dimethacrylate, poly(acrylonitrile) (PAN), polyurethane (PU), poly(vinylidene difluoride) (PVdF), poly(ethylene oxide) (PEO), poly(propylene oxide) poly(ethyleneglycol dimethylether), poly(ethyleneglycol diethylether), poly[bis(methoxy ethoxyethoxide)-phosphazene], poly(dimethylsiloxane) (PDMS), polyacene, polydisulfide, polystyrene, polystyrene sulfonate, polypyrrole, polyaniline, polythiophene, polythione, polyvinyl pyridine (PVP), polyvinyl chloride (PVC), polyaniline, poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, poly(heteroacene), poly[(4-styrenesulfonyl)(trifluoromethanesulfonyl)imide-co-methoxy-polyethyleneglycolacrylate] (Li[PSTFSI-co-MPEGA]), sulfonated poly(phenylene oxide) (PPO), N,N-dimethylacryl amide (DMAAm), and lithium 2-acrylamido-2-methyl-1-propane sulfonate (LiAMPS), Poly(lithium 2-Acrylamido-2-Methyl-propanesulfonic Acid-Co-Vinyl Triethoxysilane), polyethyleneoxide (PEO)/poly(lithium sorbate), PEO/poly(lithium muconate), PEO/[poly(lithium sorbat)+BF$_3$], PEO copolymer, and PEO terpolymer poly.

16. A semi-solid electrode, comprising:
an active material;
a conductive material; and
about 20% to about 70% by volume of an electrolyte, the electrolyte including about 0.01% to 1.5% by weight of an additive formulated to modify the rheology of the semi-solid electrode,
wherein a total additive content in the electrolyte is less than or equal to 1.5% by weight; and
wherein the semi-solid electrode does not include a binder.

17. The semi-solid electrode of claim 16, wherein the semi-solid electrode further includes about 1% to about 30% by volume of a high capacity material.

18. The semi-solid electrode of claim 16, wherein the electrolyte includes about 0.1% to about 1% by weight of the additive.

19. The semi-solid electrode of claim 16, wherein the additive includes at least one of a poly(ethyleneglycol dimethacrylate), poly(ethyleneglycol diacrylate), poly(propyleneglycol dimethacrylate), poly(propyleneglycol diacrylate), and poly(methyl methacrylate) (PMMA), polyethylene glycol dimethacrylate, poly(acrylonitrile) (PAN), polyurethane (PU), poly(vinylidene difluoride) (PVdF), poly(ethylene oxide) (PEO), poly(propylene oxide) poly(ethyleneglycol dimethylether), poly(ethyleneglycol diethylether), poly[bis(methoxy ethoxyethoxide)-phosphazene], poly(dimethylsiloxane) (PDMS), polyacene, polydisulfide, polystyrene, polystyrene sulfonate, polypyrrole, polyaniline, polythiophene, polythione, polyvinyl pyridine (PVP), polyvinyl chloride (PVC), polyaniline, poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-substituted polyethylene, carbazole-substituted polyethylene, polyoxyphenazine, poly(heteroacene), poly[(4-styrenesulfonyl)(trifluoromethanesulfonyl)imide-co-methoxy-polyethyleneglycolacrylate] (Li[PSTFSI-co-MPEGA]), sulfonated poly(phenylene oxide) (PPO), N,N-dimethylacryl amide (DMAAm), and lithium 2-acrylamido-2-methyl-1-propane sulfonate (LiAMPS), Poly(lithium 2-Acrylamido-2-Methyl-propanesulfonic Acid-Co-Vinyl Triethoxysilane), polyethyleneoxide (PEO)/poly(lithium sorbate), PEO/poly(lithium muconate), PEO/[poly(lithium sorbat)+BF$_3$], PEO copolymer, and PEO terpolymer poly.

20. The semi-solid electrode of claim 16, wherein the semi-solid electrode is cured for at least 24 hours.

21. The semi-solid electrode of claim 1, further comprising:
a conductive material.

* * * * *